(12) United States Patent
Onose et al.

(10) Patent No.: US 10,587,089 B2
(45) Date of Patent: Mar. 10, 2020

(54) SOLID-STATE LASER DEVICE, SOLID-STATE LASER SYSTEM, AND LASER DEVICE FOR EXPOSURE DEVICE

(71) Applicant: Gigaphoton Inc., Tochigi (JP)

(72) Inventors: Takashi Onose, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/446,662

(22) Filed: Jun. 20, 2019

(65) Prior Publication Data

US 2019/0305508 A1    Oct. 3, 2019

Related U.S. Application Data

(63) Continuation of application No. 16/124,434, filed on Sep. 7, 2018, now Pat. No. 10,374,382, which is a
(Continued)

(30) Foreign Application Priority Data

Apr. 7, 2016    (WO) .................. PCT/JP2016/061358

(51) Int. Cl.
*H01S 3/10*      (2006.01)
*H01S 3/23*      (2006.01)
(Continued)

(52) U.S. Cl.
CPC ............... *H01S 3/10* (2013.01); *G02F 1/353* (2013.01); *G02F 1/3532* (2013.01);
(Continued)

(58) Field of Classification Search
CPC ...... H01S 3/2308; H01S 3/06716; H01S 3/10; H01S 3/108; H01S 3/109; H01S 3/11;
(Continued)

(56) References Cited

U.S. PATENT DOCUMENTS

2010/0183040 A1    7/2010 Ishizu et al.
2011/0019705 A1    1/2011 Adams et al.
(Continued)

FOREIGN PATENT DOCUMENTS

JP    H11-285872 A    10/1999
JP    2009-229715 A   10/2009
(Continued)

OTHER PUBLICATIONS

International Search Report issued in PCT/JP2016/061358; dated Jun. 21, 2016.
(Continued)

*Primary Examiner* — Armando Rodriguez
(74) *Attorney, Agent, or Firm* — Studebaker & Brackett PC

(57) ABSTRACT

A solid state laser device includes a seed laser that outputs continuous wave laser seed light, a light intensity changeable unit that changes a light intensity thereof and outputs seed pulse light, a CW excitation laser that outputs continuous wave excitation light, an amplifier that amplifies the seed pulse light and outputs amplified light based on an amplification gain increased by the excitation light, a wavelength conversion unit that converts a wavelength of the amplified light and outputs harmonic light, and a light intensity control unit that allows the light intensity changeable unit to output the seed pulse light after a certain time elapsed from an input of an external trigger signal each time the signal is input and output suppression light that suppresses an increase of the amplification gain in a period after an output of the seed pulse light until an input of a next external trigger signal.

19 Claims, 21 Drawing Sheets

Related U.S. Application Data continuation of application No. PCT/JP2017/010674, filed on Mar. 16, 2017.

(51) Int. Cl.

| | | |
|---|---|---|
| G02F 1/35 | (2006.01) | |
| G02F 1/355 | (2006.01) | |
| H01S 3/067 | (2006.01) | |
| H01S 3/108 | (2006.01) | |
| H01S 3/109 | (2006.01) | |
| H01S 3/11 | (2006.01) | |
| H01S 3/115 | (2006.01) | |
| H01S 3/16 | (2006.01) | |
| G02F 1/37 | (2006.01) | |
| H01S 3/131 | (2006.01) | |
| H01S 3/0941 | (2006.01) | |
| H01S 3/0971 | (2006.01) | |
| H01S 3/00 | (2006.01) | |

(52) U.S. Cl.
CPC ............ *G02F 1/3551* (2013.01); *G02F 1/37* (2013.01); *H01S 3/06716* (2013.01); *H01S 3/1001* (2019.08); *H01S 3/108* (2013.01); *H01S 3/109* (2013.01); *H01S 3/10015* (2013.01); *H01S 3/11* (2013.01); *H01S 3/115* (2013.01); *H01S 3/131* (2013.01); *H01S 3/1618* (2013.01); *H01S 3/2308* (2013.01); *H01S 3/2375* (2013.01); *G02F 2001/354* (2013.01); *H01S 3/0092* (2013.01); *H01S 3/06754* (2013.01); *H01S 3/0971* (2013.01); *H01S 3/09415* (2013.01); *H01S 3/1003* (2013.01); *H01S 3/2325* (2013.01); *H01S 3/2366* (2013.01); *H01S 3/2391* (2013.01)

(58) Field of Classification Search
CPC ........ H01S 3/115; H01S 3/131; H01S 3/1618; G02F 1/353; G02F 1/3532; G02F 1/3551; G02F 2001/354

See application file for complete search history.

(56) References Cited

U.S. PATENT DOCUMENTS

| | | |
|---|---|---|
| 2012/0243565 A1 | 9/2012 | Onose et al. |
| 2012/0250710 A1 | 10/2012 | Yoshino et al. |
| 2015/0116680 A1 | 4/2015 | Tokuhisa |

FOREIGN PATENT DOCUMENTS

| | | |
|---|---|---|
| JP | 2010-171131 A | 8/2010 |
| JP | 2011-192831 A | 9/2011 |
| JP | 2012-038895 A | 2/2012 |
| JP | 2012-199425 A | 10/2012 |
| JP | 2012-204820 A | 10/2012 |
| JP | 2014-053627 A | 3/2014 |
| JP | 2014-191220 A | 10/2014 |
| WO | 2013/133279 A1 | 9/2013 |

OTHER PUBLICATIONS

The International Preliminary Report on Patentability and Translation of Written Opinion of the International Searching Authority; PCT/JP2016/061358; dated Oct. 9, 2018.
International Search Report issued in PCT/JP2017/010674; dated May 30, 2017.
The International Preliminary Report on Patentability and Translation of Written Opinion of the International Searching Authority; PCT/JP2017/010674; dated Oct. 9, 2018.

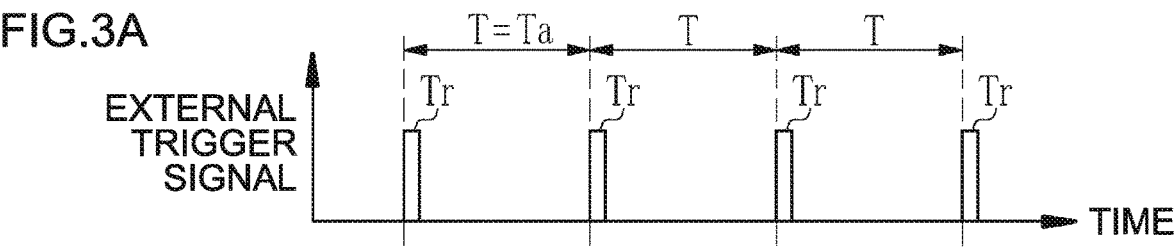
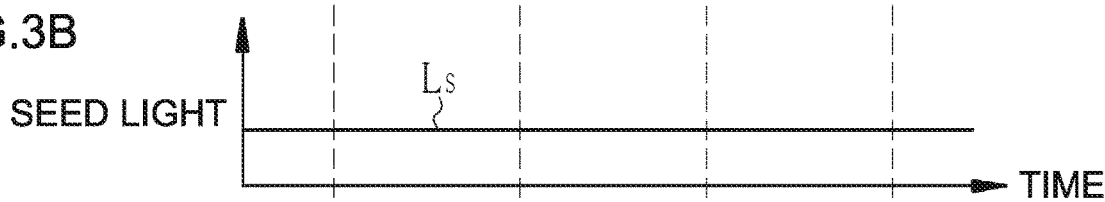
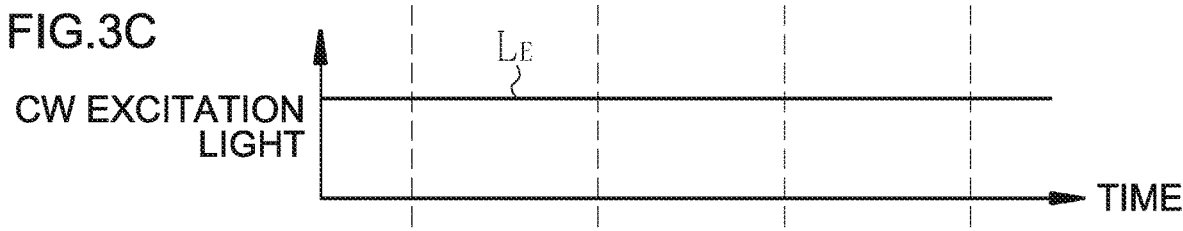
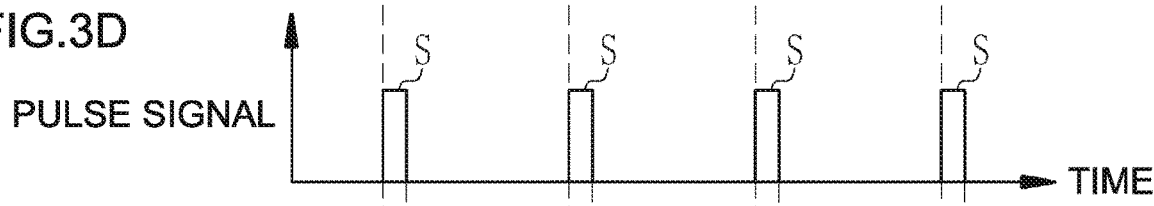
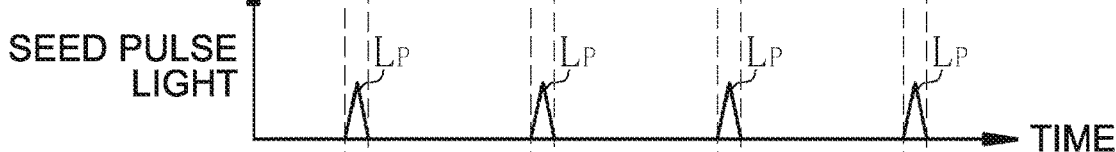
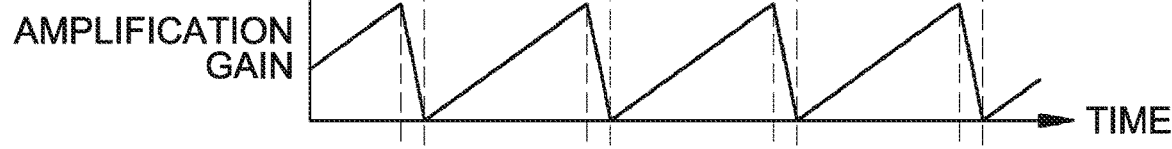
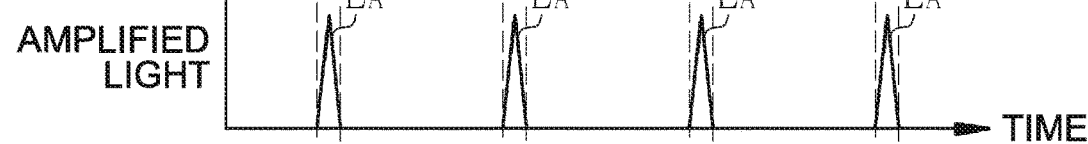
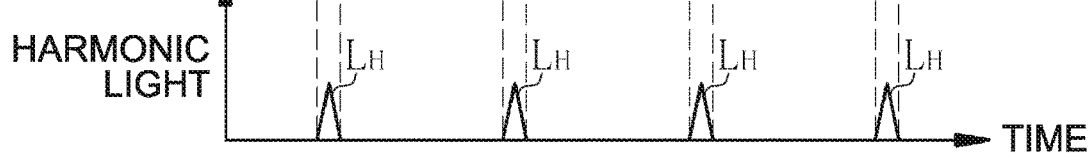

FIG.8A EXTERNAL TRIGGER SIGNAL
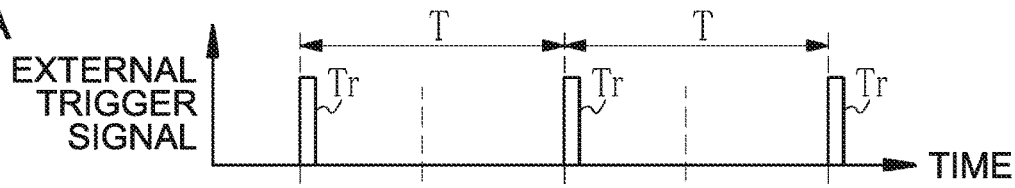
FIG.8B SEED LIGHT
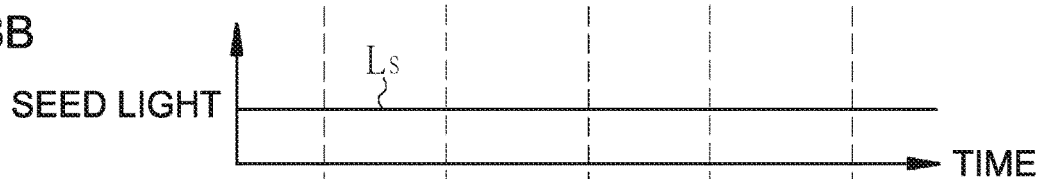
FIG.8C CW EXCITATION LIGHT
FIG.8D PULSE SIGNAL
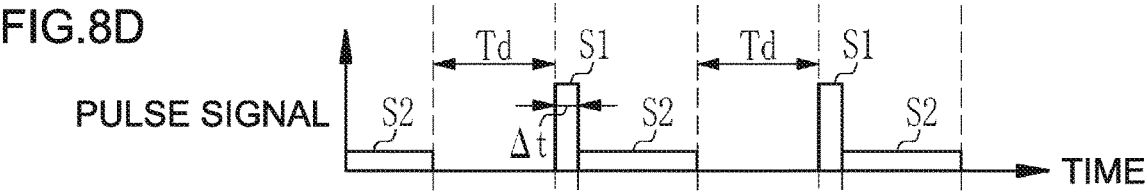
FIG.8E SEED PULSE LIGHT
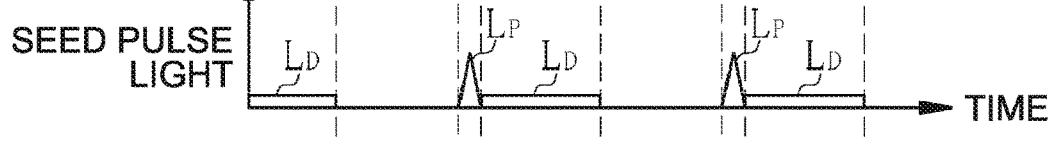
FIG.8F AMPLIFICATION GAIN
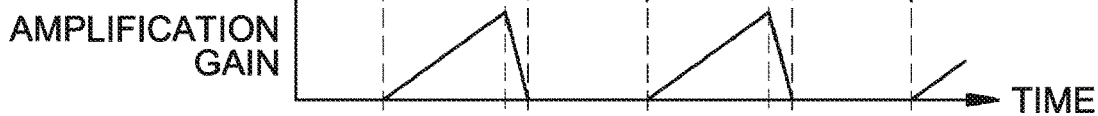
FIG.8G AMPLIFIED LIGHT
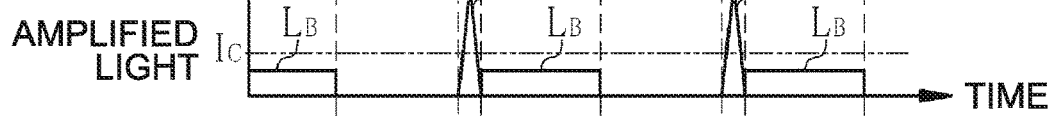
FIG.8H HARMONIC LIGHT
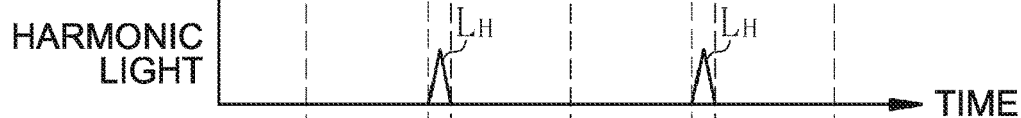
FIG.8I FF CIRCUIT
| S | St↑ | 0 | St↑ | 0 | St↑ |
|---|-----|---|-----|---|-----|
| R | 0 | Tr↑ | 0 | Tr↑ | 0 |
| Q | 1 | 0 | 1 | 0 | 1 |
FIG.8J ADDER CIRCUIT
| In1 | S2 | 0 | 0 | S2 | 0 | 0 | S2 |
|-----|----|---|---|----|----|----|----|
| In2 | 0 | 0 | S1 | 0 | 0 | S1 | 0 |
| Out | S2 | 0 | S1 | S2 | 0 | S1 | S2 |

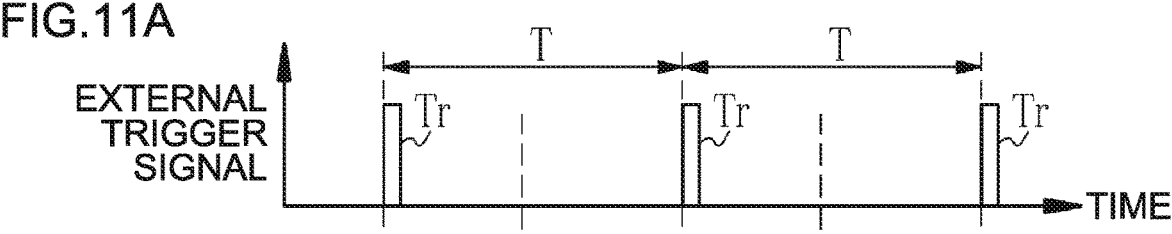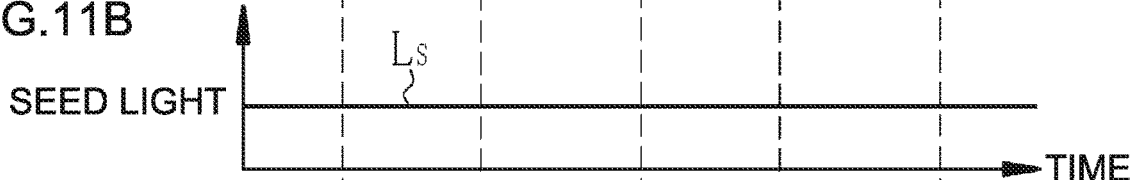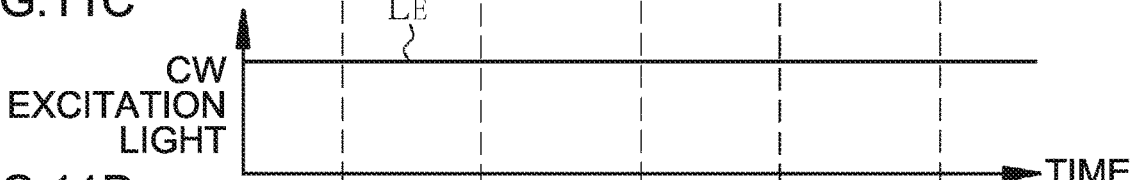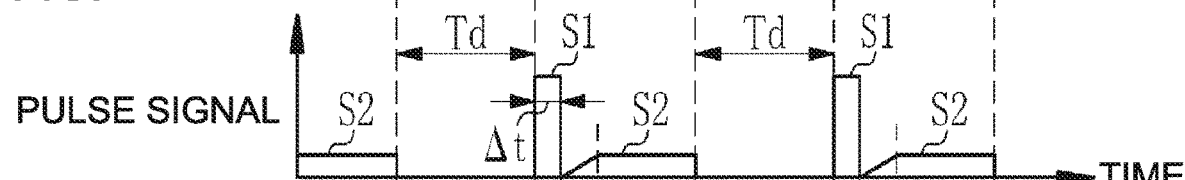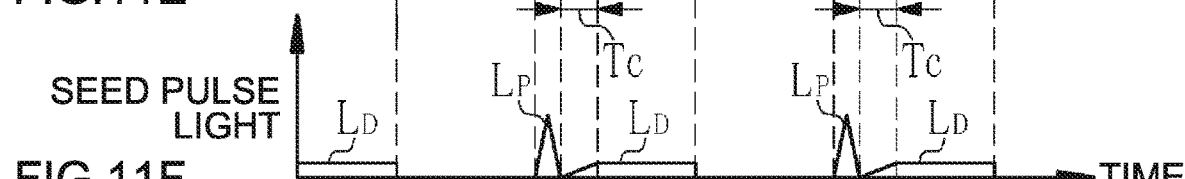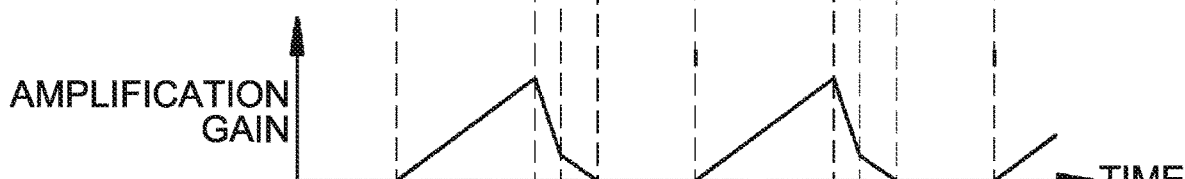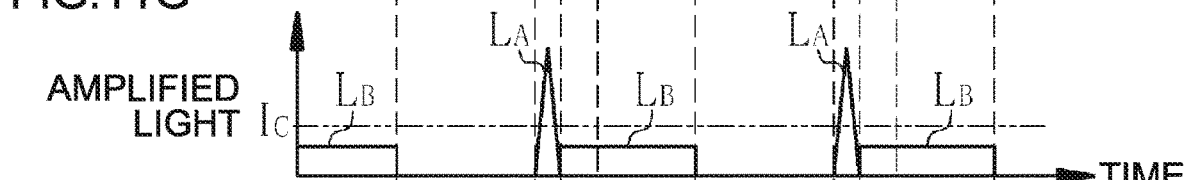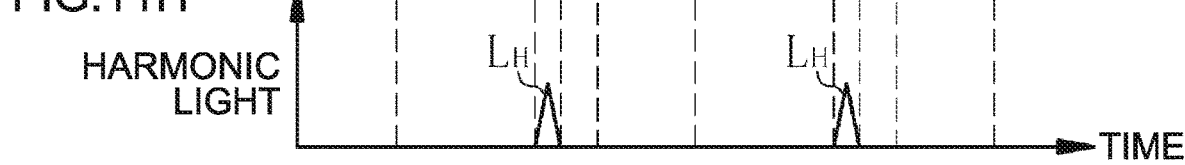

FIG.13A EXTERNAL TRIGGER SIGNAL
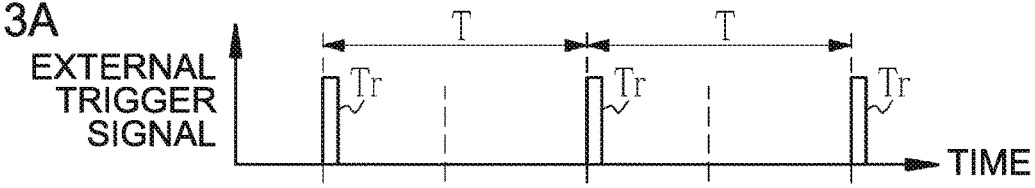
FIG.13B SEED LIGHT
FIG.13C CW EXCITATION LIGHT
FIG.13D PULSE SIGNAL
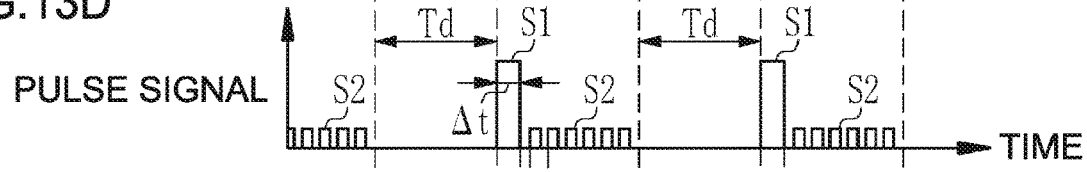
FIG.13E SEED PULSE LIGHT
FIG.13F AMPLIFICATION GAIN
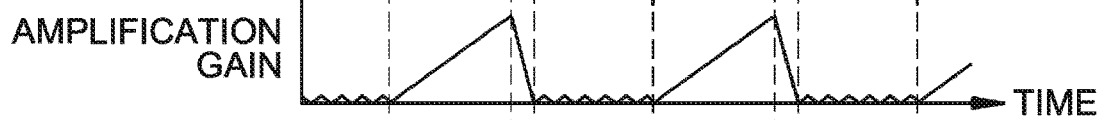
FIG.13G AMPLIFIED LIGHT
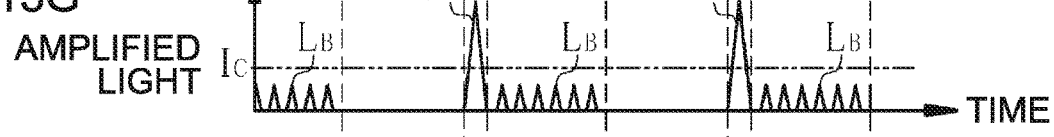
FIG.13H HARMONIC LIGHT
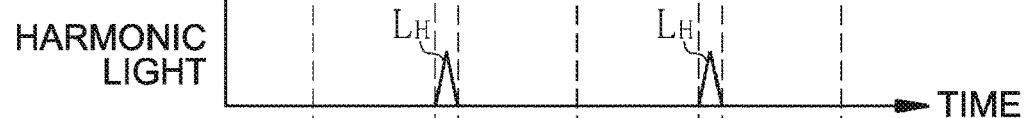
FIG.13I FF CIRCUIT
| S | St↑ | 0 | St↑ | 0 | St↑ |
|---|---|---|---|---|---|
| R | 0 | Tr↑ | 0 | Tr↑ | 0 |
| Q | 1 | 0 | 1 | 0 | 1 |
FIG.13J ADDER CIRCUIT
| In1 | S2 | 0 | 0 | S2 | 0 | 0 | S2 |
|---|---|---|---|---|---|---|---|
| In2 | 0 | 0 | S1 | 0 | 0 | S1 | 0 |
| Out | S2 | 0 | S1 | S2 | 0 | S1 | S2 |

SOLID-STATE LASER DEVICE, SOLID-STATE LASER SYSTEM, AND LASER DEVICE FOR EXPOSURE DEVICE

CROSS-REFERENCE TO RELATED APPLICATIONS

This application is a Continuation of U.S. patent application Ser. No. 16/124,434 filed Sep. 7, 2018, which is a continuation application of International Application No. PCT/JP2017/010674 filed on Mar. 16, 2017 claiming priority to International Application No. PCT/JP2016/061358 filed on Apr. 7, 2016. Each of the above applications is incorporated herein by reference in its entirety.

BACKGROUND

1. Technical Field

The present disclosure relates to a solid-state laser device, a solid-state laser system, and a laser device for an exposure device.

2. Related Art

Along with development of micronizing and high integration of semiconductor integrated circuits, an improvement in resolution is required in semiconductor exposure devices. A semiconductor exposure device will be simply referred to as an "exposure device" in the following description. Accordingly, a wavelength of light output from an exposure light source is getting shortened. As an exposure light source, a gas laser device is used, instead of a conventional mercury lamp. At present, as for laser devices for exposure, a KrF excimer laser device configured to output ultraviolet light having a wavelength of 248 nm, and an ArF excimer laser device configured to output ultraviolet light having a wavelength of 193.4 nm are used.

Currently, as an exposure technology, immersion exposure is put into practice. In the immersion exposure, a space between a projection lens on the exposure device side and a wafer is filled with liquid, whereby the refractive index of the space is changed. Thereby, an apparent wavelength of the light source for exposure is shortened. In the case where immersion exposure is performed with use of an ArF excimer laser device as a light source for exposure, a wafer is irradiated with ultraviolet light having a wavelength of 134 nm in the water. This technology is called ArF immersion exposure. ArF immersion exposure is also referred to as ArF immersion lithography.

The spectral linewidth in natural oscillation in KrF and ArF excimer laser devices is wide, approximately ranging from 350 pm to 400 pm. This causes chromatic aberration of laser light (ultraviolet light) reduced and projected on the wafer by the projection lens on the exposure device side. Thereby, the resolution is lowered. As such, it is necessary to narrow the spectral linewidth of laser light output from a gas laser device to a degree in which chromatic aberration can be disregarded. Accordingly, a line narrowing module having a line narrowing element is provided to the laser resonator of a gas laser device. By the line narrowing module, narrowing of the spectral linewidth is realized. The line narrowing element may be an etalon, a grating, or the like. A laser device in which the spectral linewidth is narrowed as described above is referred to as a line narrowed laser device.

Meanwhile, as a laser device for an exposure device, there is a configuration including a master oscillator (MO) and a power oscillator (PO). In such a laser device for an exposure device, excimer laser devices are used for the MO and the PO. However, from the viewpoint of energy saving, a laser device for an exposure device to which a solid-state laser device is applied is being developed. A solid-state laser device is configured to include a semiconductor laser, a nonlinear crystal, and the like. Such a solid-state laser device is applicable not only to a laser device for an exposure device, but also to a laser device for processing and the like.

CITATION LIST

Patent Literature

Patent Literature 1: Japanese Patent Application Laid-Open No. 2014-053627
Patent Literature 2: Japanese Patent Application Laid-Open No. 2011-192831
Patent Literature 3: Japanese Patent Application Laid-Open No. 11-285872
Patent Literature 4: Japanese Patent Application Laid-Open No. 2009-229715
Patent Literature 5: Japanese Patent Application Laid-Open No. 2012-199425

SUMMARY

A solid state laser device, according to one aspect of the present disclosure, may include a seed laser, a light intensity changeable unit, a CW excitation laser, an amplifier, a wavelength conversion unit, and a light intensity control unit. The seed laser may be configured to output seed light that is continuous wave laser light. The light intensity changeable unit may be configured to change a light intensity of the seed light to thereby make the seed light pulsed and output the pulsed seed light as seed pulse light. The CW excitation laser may be configured to output continuous wave excitation light. The amplifier may be configured to amplify the seed pulse light and output the amplified seed pulse light as amplified light, based on an amplification gain increased by light excitation by the continuous wave excitation light. The wavelength conversion unit may be configured to convert a wavelength of the amplified light and output harmonic light. The light intensity control unit may be configured to control the light intensity changeable unit according to an input of an external trigger signal. The light intensity control unit may allow the light intensity changeable unit to output the seed pulse light after a certain time elapsed from an input of the external trigger signal each time the external trigger signal is input, and allow the light intensity changeable unit to output suppression light that suppresses an increase of the amplification gain in a period after an output of the seed pulse light until an input of a next external trigger signal.

A solid state laser system, according to one aspect of the present disclosure, may include a first solid-state laser device, a second solid-state laser device, and a sum frequency wavelength conversion unit. The first solid-state laser device may include a first seed laser, a first light intensity changeable unit, a first CW excitation laser, a first amplifier, and a first light intensity control unit. The first seed laser may be configured to output first seed light that is continuous wave laser light. The first light intensity changeable unit may be configured to change a light intensity of the first seed light to thereby make the first seed light pulsed and output the pulsed first seed light as first seed pulse light. The first CW excitation laser may be configured to output first continuous wave excitation light. The first amplifier may be configured to amplify the first seed pulse light and output the amplified first seed pulse light as first amplified light, based on an amplification gain increased by light excitation by the first continuous wave excitation light. The first light intensity control unit may be configured to control the first light intensity changeable unit according to an input of an external trigger signal. The first light intensity control unit may allow the first light intensity changeable unit to output the first seed pulse light after a certain time elapsed from an input of the external trigger signal each time the external trigger signal is input, and allow the first light intensity changeable unit to output first suppression light that suppresses an increase of the amplification gain of the first amplifier in a period after an output of the first seed pulse light until an input of a next external trigger signal. The second solid-state laser device may include a second seed laser, a second light intensity changeable unit, a second CW excitation laser, a second amplifier, and a second light intensity control unit. The second seed laser may be configured to output second seed light that is continuous wave laser light. The second light intensity changeable unit may be configured to change a light intensity of the second seed light to thereby make the second seed light pulsed and output the pulsed second seed light as second seed pulse light. The second CW excitation laser may be configured to output second continuous wave excitation light. The second amplifier may be configured to amplify the second seed pulse light and output the amplified second seed pulse light as second amplified light, based on an amplification gain increased by light excitation by the second continuous wave excitation light. The second light intensity control unit may be configured to control the second light intensity changeable unit according to an input of an external trigger signal. The second light intensity control unit may allow the second light intensity changeable unit to output the second seed pulse light after a certain time elapsed from an input of the external trigger signal each time the external trigger signal is input, and allow the second light intensity changeable unit to output second suppression light that suppresses an increase of the amplification gain of the second amplifier in a period after an output of the second seed pulse light until an input of a next external trigger signal. The sum frequency wavelength conversion unit may be configured to generate third pulse laser light including a sum frequency of the first pulse laser light output from the first solid-state laser device and the second pulse laser light output from the second solid-state laser device.

A laser device for an exposure device, according to one aspect of the present disclosure, may include the solid-state laser system, and an amplifier. The amplifier may include an excimer laser device. The excimer laser device may be configured to amplify third pulse laser light output from the solid-state laser system.

BRIEF DESCRIPTION OF THE DRAWINGS

Some embodiments of the present disclosure will be described below as mere examples with reference to the accompanying drawings.

FIGS. 3A to 3H are timing charts illustrating an operation of the solid-state laser device 10;

FIGS. 8A to 8J are timing charts illustrating an operation of the solid-state laser device 10a;

FIGS. 11A to 11H are timing charts illustrating an operation of the solid-state laser device 10a including the light intensity control unit 20 according to a third modification;

FIGS. 13A to 13J are timing charts illustrating an operation of the solid-state laser device 10a including the light intensity control unit 20 according to the fourth modification;

EMBODIMENTS

Figure 1:
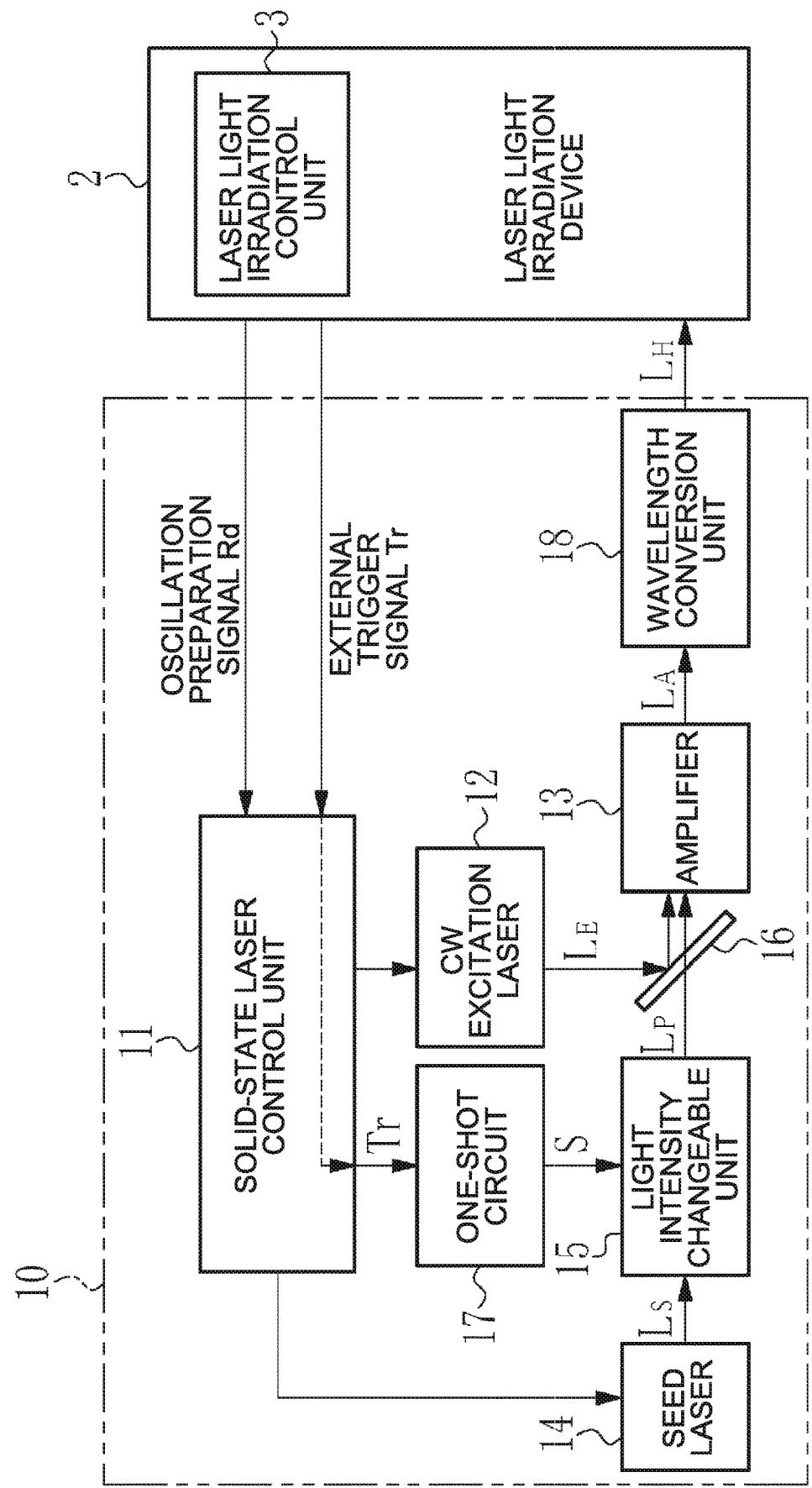
FIG. 1 schematically illustrates a configuration of a solid-state laser device 10 according to a comparative example.

Contents
1. Comparative example
   1.1 Configuration
   1.2 Operation
   1.3 Problem
2. First embodiment
   2.1 Configuration
   2.2 Operation
   2.3 Effect
   2.4 First and second signal setting conditions
   2.5 Definition of wavelength conversion threshold
3. Modifications of light intensity control unit
   3.1 First modification
   3.2 Second modification
   3.3 Third modification
   3.4 Fourth modification 3.5 Fifth modification
3.6 Sixth modification
4. Case where pulse interval of external trigger signals is acyclic
5. Exemplary configuration of light intensity changeable unit
  5.1 First exemplary configuration
    5.1.1 Configuration
    5.1.2 Operation
  5.2 Second exemplary configuration
    5.2.1 Configuration
    5.2.2 Operation
6. Exemplary application of solid-state laser device to a laser device including MO and amplifier
  6.1 Configuration
  6.2 Operation
  6.3 Effect
  6.4 Definition of wavelength conversion threshold
  6.5 Modifications related to wavelength conversion unit
  6.6 Modifications of amplifier
    6.6.1 First modification
    6.6.2 Second modification
7. Other modifications Hereinafter, embodiments of the present disclosure will be described in detail with reference to the drawings. The embodiments described below illustrate some examples of the present disclosure, and do not limit the contents of the present disclosure. All of the configurations and the operations described in the embodiments are not always indispensable as configurations and operations of the present disclosure. It should be noted that the same constituent elements are denoted by the same reference signs, and overlapping description is omitted.

1. Comparative Example

1.1 Configuration

FIG. 1 schematically illustrates a configuration of a solid-state laser device 10 according to a comparative example. In FIG. 1, the solid-state laser device 10 includes a solid-state laser control unit 11, a CW excitation laser 12, an amplifier 13, a seed laser 14, a light intensity changeable unit 15, a dichroic mirror 16, a one-shot circuit 17, and a wavelength conversion unit 18.

The solid-state laser device 10 is connected with a laser light irradiation device 2 as an external device. A pulse-state oscillation preparation signal Rd and a pulse-state external trigger signal Tr are input to the solid-state laser control unit 11 from the laser light irradiation control unit 3 included in the laser light irradiation device 2.

The CW excitation laser 12 is a light source that outputs continuous wave (CW) excitation light $L_E$ that is light having a wavelength capable of being optically excited by the amplifier 13. The CW excitation laser 12 is a semiconductor laser that outputs CW excitation light $L_E$ having a wavelength of about 976 nm, for example. The amplifier 13 is a solid-state amplifier including an optical crystal doped with Yb, a fiber amplifier including synthetic quartz doped with Yb, or a combination thereof. The CW excitation light $L_E$ output from the CW excitation laser 12 is reflected at a high rate by the dichroic mirror 16 and is input to the amplifier 13.

The seed laser 14 is a light source that outputs seed light $L_S$. The seed laser 14 is a distributed-feedback semiconductor laser that outputs CW laser light having a wavelength of about 1,060 nm as the seed light $L_S$. It is preferable that the wavelength of the seed light $L_S$ is in a wavelength range from 1,020 nm to 1,090 nm.

The light intensity changeable unit 15 is an optical shutter formed of a combination of an electro optical (EO) Pockels cell and a polarizer. The light intensity changeable unit 15 is disposed between the seed laser 14 and the dichroic mirror 16. The light intensity changeable unit 15 may be a semiconductor amplifier.

When the one-shot circuit 17 receives an input of the external trigger signal Tr from the solid-state laser control unit 11, the one-shot circuit 17 generates a pulse signal S having a predetermined pulse width and outputs it to the light intensity changeable unit 15. When the pulse signal S is input from the one-shot circuit 17 in a state where the seed light $L_S$ is input from the seed laser 14, the light intensity changeable unit 15 detects a rising edge of the pulse signal S, and transmits the seed light $L_S$ only during a period corresponding to the pulse width of the pulse signal S. This means that the light intensity changeable unit 15 outputs seed pulse light $L_P$ generated by the seed light $L_S$ made into a pulse, according to the pulse signal S input from the one-shot circuit 17.

The dichroic mirror 16 is disposed at a position where the optical path of the seed pulse light $L_P$ and the optical path of the CW excitation light $L_E$ cross each other, in such a manner that the optical path of the seed pulse light $L_P$ and the optical path of the CW excitation light $L_E$ substantially match. A surface of the dichroic mirror 16 is coated with a film at which the CW excitation light $L_E$ output from the CW excitation laser 12 is reflected at a high rate and which highly transmits the seed pulse light $L_P$ output from the light intensity changeable unit 15.

The amplifier 13 is optically excited when the CW excitation light $L_E$ is input thereto, and in a state where inverted population is formed, the seed pulse light $L_P$ is input thereto. When the seed pulse light $L_P$ is input to the amplifier 13, light amplification is caused by stimulated emission. The seed pulse light $L_P$ is amplified by the amplifier 13, and is output as amplified light $L_A$. When the light is amplified by the stimulated emission, inverted population of the amplifier 13 is consumed.

The wavelength conversion unit 18 includes a non-linear crystal that converts the amplified light $L_A$ to harmonic light $L_H$. The harmonic light $L_H$ is third harmonic light having a wavelength of about 355 nm, or a fourth harmonic light having a wavelength of about 266 nm. When the wavelength conversion unit 18 includes an LBO ($LiB_3O_5$) crystal, a BBO ($\beta$-$BaB_2O_4$) crystal or the like as a non-linear crystal, third harmonic light is generated as the harmonic light $L_H$. When the wavelength conversion unit 18 includes an LBO crystal and a CLBO ($CsLiB_6O_{10}$) crystal as a non-linear crystal, fourth harmonic light is generated as the harmonic light $L_H$.

1.2 Operation

Figure 2:
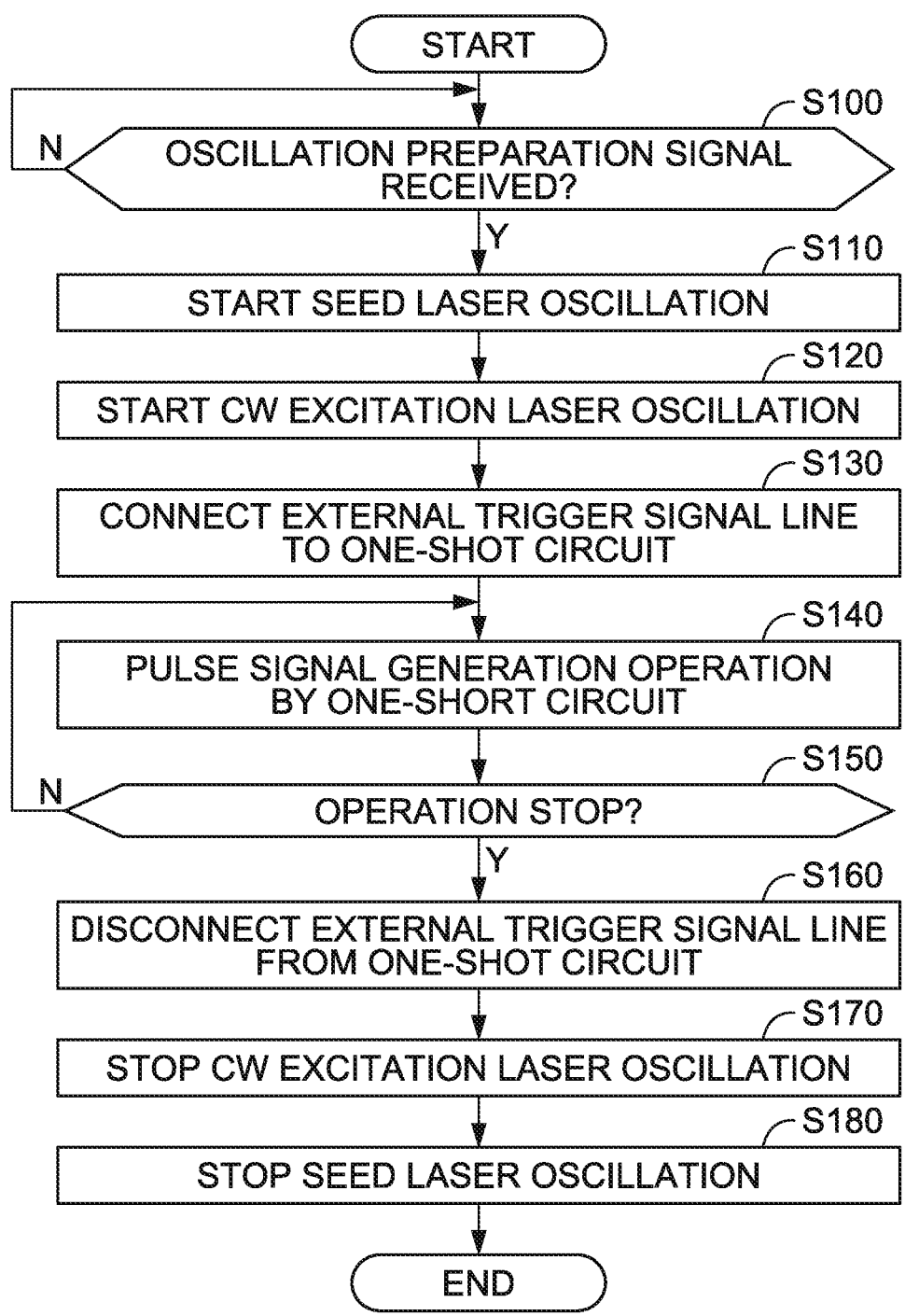
FIG. 2 is a flowchart illustrating an operation of the solid-state laser device 10 illustrated in FIG. 1.

FIG. 2 is a flowchart illustrating the operation of the solid-state laser device 10 illustrated in FIG. 1. FIGS. 3A to 3H are timing charts illustrating an operation of the solid-state laser device 10. In the timing charts of FIGS. 3A and 3D, the vertical axis represents the voltage value. In the timing charts of FIGS. 3B, 3C, 3E, 3G, and 3H, the vertical axis represents the light intensity. The vertical axis in the timing chart of FIG. 3F represents an amplification gain.

The solid-state laser control unit 11 included in the solid-state laser device 10 controls the operation of the solid-state laser device 10 through the processes described below.

First, at S100, the solid-state laser control unit 11 determines whether or not it has received an oscillation preparation signal Rd from the laser light irradiation device 2. When the solid-state laser control unit 11 has not received the oscillation preparation signal Rd (S100; NO), the solid-state laser control unit 11 waits until it receives the oscillation preparation signal Rd. Upon receipt of the oscillation preparation signal Rd (S100; YES), the solid-state laser control unit 11 proceeds to S110.

At S110, the solid-state laser control unit 11 controls the seed laser 14 to start laser oscillation operation, and allows the seed laser 14 to output the seed light $L_S$ having a constant light intensity, as illustrated in FIG. 3B. The seed light $L_S$ output from the seed laser 14 is input to the light intensity changeable unit 15, and until the external trigger signal Tr, described later, is input to the solid-state laser control unit 11, transmission is suppressed by the light intensity changeable unit 15.

Next, at S120, the solid-state laser control unit 11 controls the CW excitation laser 12 to start laser oscillation operation, and allows the CW excitation laser 12 to output the CW excitation light $L_E$ having constant a light intensity, as illustrated in FIG. 3C. The CW excitation light $L_E$ output from the CW excitation laser 12 is reflected at a high rate by the dichroic mirror 16 to thereby be input to the amplifier 13, and optically excites the amplifier 13. In the amplifier 13, light excitation is generated with the CW excitation light $L_E$, whereby inverted population is formed. The number of atoms in the excited state of the inverted population is increased as the incident time of the CW excitation light $L_E$ elapses. This means that as illustrated in FIG. 3F, the amplification gain of the amplifier 13 is increased as the incident time of the CW excitation light $L_E$ elapses.

Next, at S130, the solid-state laser control unit 11 connects the external trigger signal line, illustrated by a broken line in FIG. 1, to the one-shot circuit 17 to thereby enable the external trigger signal Tr to be input to the one-shot circuit 17. Accordingly, as illustrated in FIG. 3A, when the external trigger signal Tr is input from the laser light irradiation device 2 to the solid-state laser control unit 11, the external trigger signal Tr is input to the one-shot circuit 17 via the external trigger signal line.

At S140, when the external trigger signal Tr is input to one-shot circuit 17, the one-shot circuit 17 generates a pulse signal S having a given pulse width as illustrated in FIG. 3D and outputs it to the light intensity changeable unit 15. When the pulse signal S is input from the one-shot circuit 17, the light intensity changeable unit 15 transmits the seed light $L_S$ only during the period corresponding to the pulse width of the pulse signal S. Thereby, as illustrated in FIG. 3E, seed pulse light $L_P$ having a pulse width corresponding to the pulse signal S is output from the light intensity changeable unit 15. The seed pulse light $L_P$ passes through, at a high rate, the dichroic mirror 16 and is input to the amplifier 13.

When the seed pulse light $L_P$ is input to the amplifier 13, light amplification is caused by stimulated emission, and the amplified light $L_A$ is output as illustrated in FIG. 3G. The light intensity of the amplified light $L_A$ depends on the magnitude of the amplification gain at the point of time when the seed pulse light $L_P$ is input to the amplifier 13. The amplified light $L_A$ output from the amplifier 13 is input to the wavelength conversion unit 18. When the amplified light $L_A$ is input to the wavelength conversion unit 18, the amplified light $L_A$ is converted to the harmonic light $L_H$ and is output, as illustrated in FIG. 3H. The harmonic light $L_H$ is made incident on an illumination optical system, not illustrated, of the laser light irradiation device 2, as ultraviolet pulse laser light.

The inverted population of the amplifier 13 is consumed when the amplified light $L_A$ is generated, and along with it, the amplification gain is decreased. The amplification gain of the amplifier 13 is increased again with the incident CW excitation light $L_E$, from the point of time when the inverted population is consumed by the amplified light $L_A$.

At S150, the solid-state laser control unit 11 determines whether or not to stop operation of the solid-state laser device 10. For example, when the solid-state laser control unit 11 receives a stop signal, not illustrated, from the laser light irradiation device 2, the solid-state laser control unit 11 determines to stop operation of the solid-state laser device 10. A stop signal is input to the solid-state laser device 10 when a failure occurs in the solid-state laser device 10 or at the time of stopping laser oscillation of the solid-state laser device 10.

When determining not to stop operation of the solid-state laser device 10 (S150; NO), the solid-state laser control unit 11 keeps the external trigger signal line connected with the one-shot circuit 17 to thereby allow the external trigger signal Tr to be input to the one-shot circuit 17. The operation of generating the pulse signal S by the one-shot circuit 17 at S140 and the laser oscillation operation accompanying thereto are performed each time the external trigger signal Tr is input to the solid-state laser control unit 11.

When determining to stop the operation of the solid-state laser device 10 (S150; YES), the solid-state laser control unit 11 proceeds to S160. At S160, the solid-state laser control unit 11 disconnects the external trigger signal line from the one-shot circuit 17. Next, at S170, the solid-state laser control unit 11 stops the laser oscillation operation of the CW excitation laser 12. Then, at S180, the solid-state laser control unit 11 stops the laser oscillation operation of the seed laser 14.

1.3 Problem

FIGS. 3A to 3H are timing charts in the case where the pulse interval T of the external trigger signals Tr, input to the solid-state laser device 10, is "Ta". Meanwhile, FIGS. 4A to 4H are timing charts in the case where the pulse interval T of the external trigger signals Tr, input to the solid-state laser device 10, is "Tb". Here, Tb>Ta.

Figure 4A:
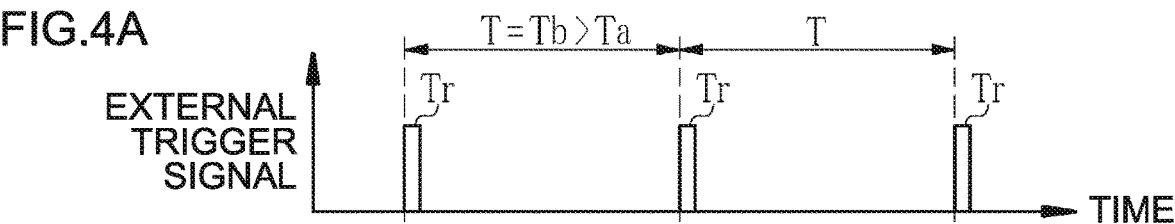
FIGS. 4A to 4H are timing charts in the case where a pulse interval T of external trigger signals Tr input to the solid-state laser device 10 is "Tb"
Figure 4B:
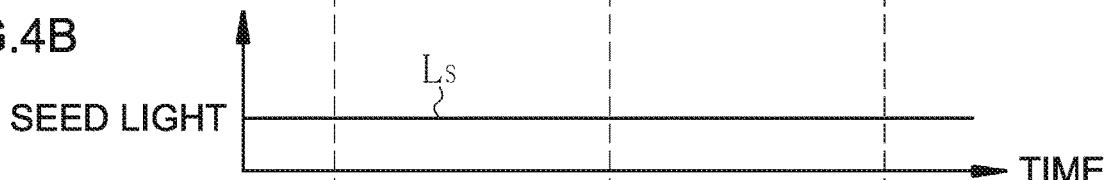
Figure 4C:
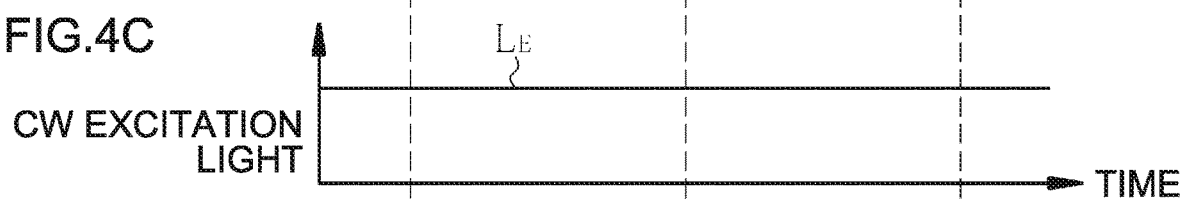
Figure 4D:
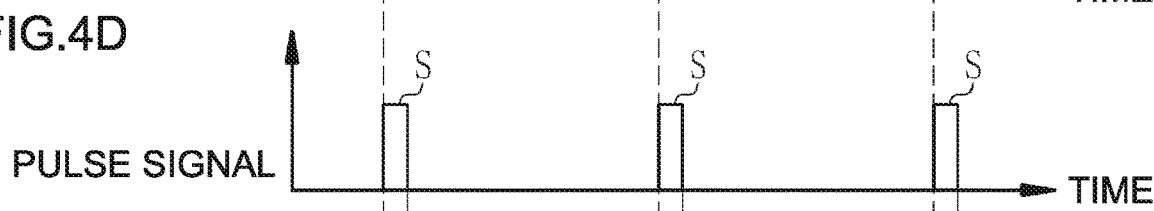
Figure 4E:
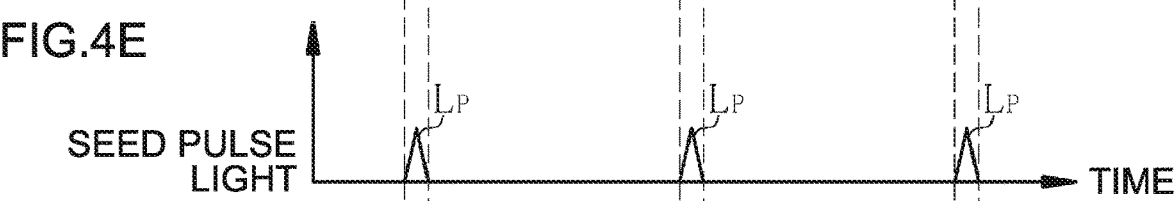
Figure 4F:
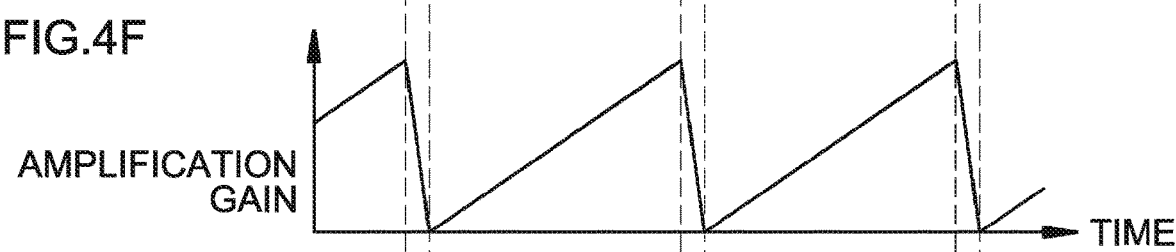

In the solid-state laser device 10 according to the comparative example, as illustrated in FIGS. 3F and 4F, the amplification gain of the amplifier 13 is gradually increased with the CW excitation light $L_E$ made incident thereon, from the point of time when the external trigger signal Tr is input to the solid-state laser device 10 and the inverted population is consumed by the generation of the amplified light $L_A$. Accordingly, the magnitude of the amplification gain, at the point of time when the next external trigger signal Tr is input to the solid-state laser device 10 and the amplified light $L_A$ is generated, depends on the pulse interval T of the external trigger signals Tr.

Figure 4G:
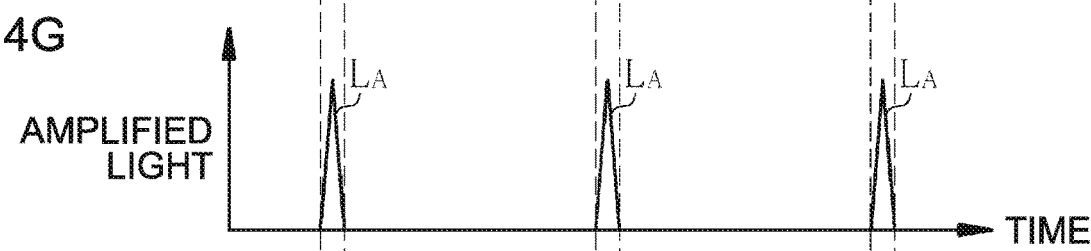

Accordingly, as the pulse interval T of the external trigger signals Tr is larger, that is, as the repetition frequency is lower, the light intensity of the amplified light $L_A$ is higher. The light intensity of the amplified light $L_A$ in the case of T=Tb as illustrated in FIG. 4G becomes higher than that in the case of T=Ta as illustrated in FIG. 3G.

Figure 4H:
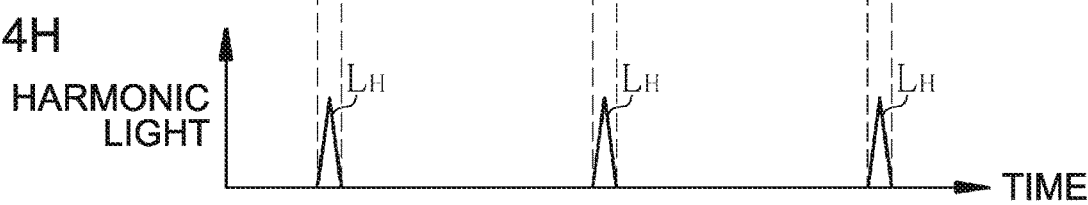

Moreover, as the light intensity of the amplified light $L_A$ is higher, the light intensity and the pulse energy of the pulse laser light made of the harmonic light $L_H$ in which the wavelength is converted by the wavelength conversion unit 18 is higher. The light intensity and the pulse energy of the pulse laser light in the case of T=Tb as illustrated in FIG. 4H become higher than those in the case of T=Ta as illustrated in FIG. 3H.

As described above, in the solid-state laser device 10 according to the comparative example, there is a problem that the light intensity and the pulse energy of the pulse laser light output to the laser light irradiation device 2 vary depending on the pulse interval T of the external trigger signals Tr.

Further, the solid-state laser device 10 according to the comparative example is used as a laser device for an exposure device. In that case, the solid-state laser device 10 performs a burst operation in which a burst period and a pause period are alternately repeated according to the external trigger signal Tr input from the laser light irradiation device 2 as an exposure device. The burst period is a period during which pulse laser light is repeatedly output according to the external trigger signal Tr, and the pause period is a period during which output of the pulse laser light is stopped. The burst period is a period during which exposure is performed in one exposure area on a semiconductor wafer in the exposure device. The pause period is a period from the time when exposure of one exposure area ends until the time when exposure of another exposure area is started. The wafer stage, not illustrated, is moved in the pause period.

When the solid-state laser device 10 performs the burst operation, the pulse interval T of the external trigger signals Tr becomes longer in the pause period. Accordingly, the light intensity and the pulse energy of the pulse laser light at the head of the burst, output to the laser light irradiation device 2 immediately after the start of the burst period, are increased. When the light intensity and the pulse energy of the pulse laser light are increased, there is a risk that the non-linear crystal included in the wavelength conversion unit 18 is damaged. Further, in the case where the amplifier 13 is an optical fiber amplifier, there is a risk that the optical fiber is damaged.

2. First Embodiment

Next, a solid-state laser device according to the first embodiment of the present disclosure will be described. In the following description, parts that are almost similar to the constituent elements of the solid-state laser device of the comparative example illustrated in FIG. 1 are denoted by the same reference signs and the description thereof may be omitted as appropriate.

2.1 Configuration

Figure 5:
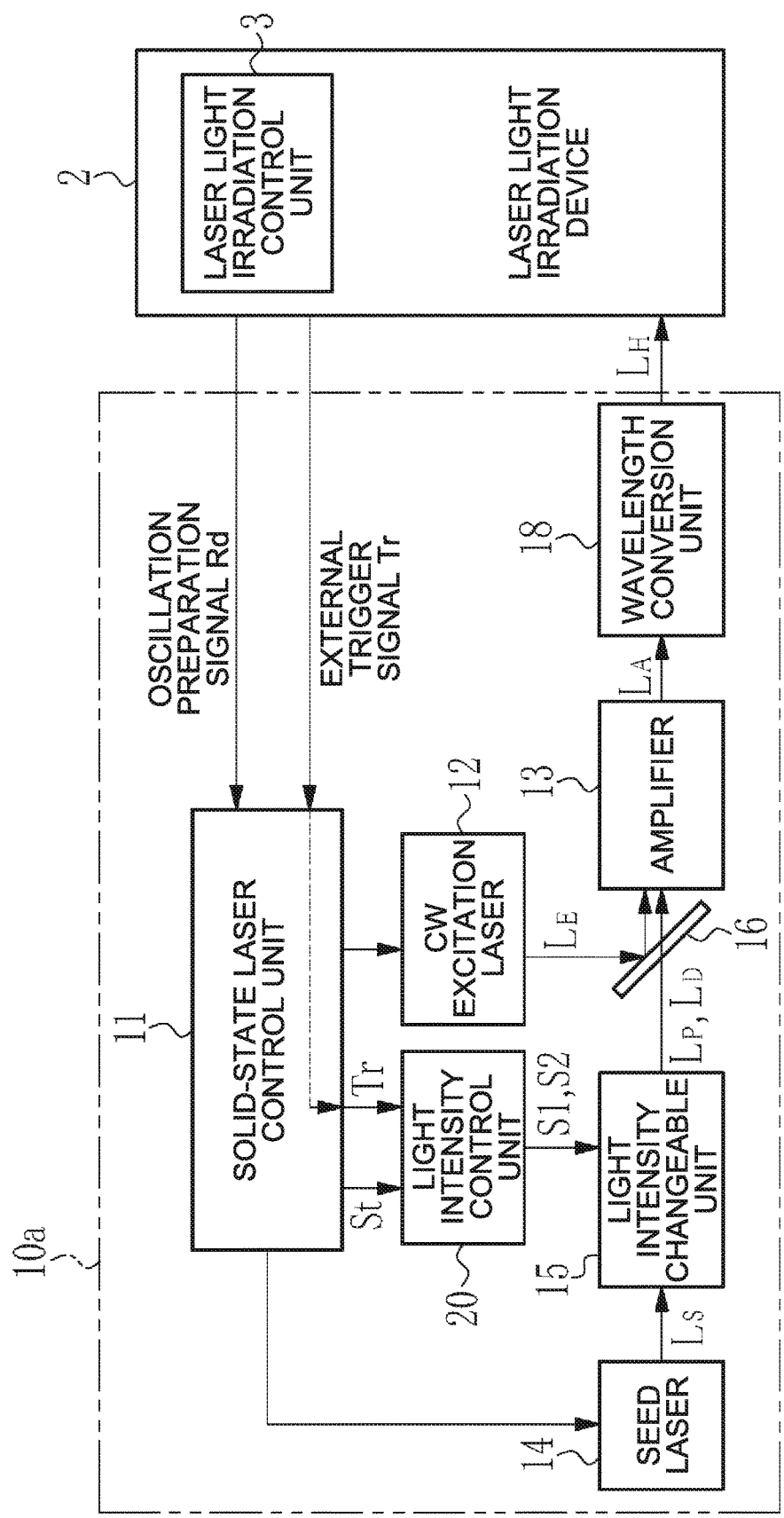
FIG. 5 schematically illustrates a configuration of a solid-state laser device 10a according to the present disclosure.

FIG. 5 schematically illustrates a configuration of a solid-state laser device 10a according to the present disclosure. In FIG. 5, the solid-state laser device 10a according to the first embodiment includes a light intensity control unit 20 instead of the one-shot circuit 17 provided in the configuration of the solid-state laser device 10 of the comparative example as illustrated in FIG. 1. Further, in the first embodiment, the solid-state laser control unit 11 is configured such that a pulse-state set signal St is input to the light intensity control unit 20, in addition to the external trigger signal Tr. The other constituent elements of the solid-state laser device 10a are the same as the constituent elements of the solid-state laser device 10 of the comparative example.

Figure 6:
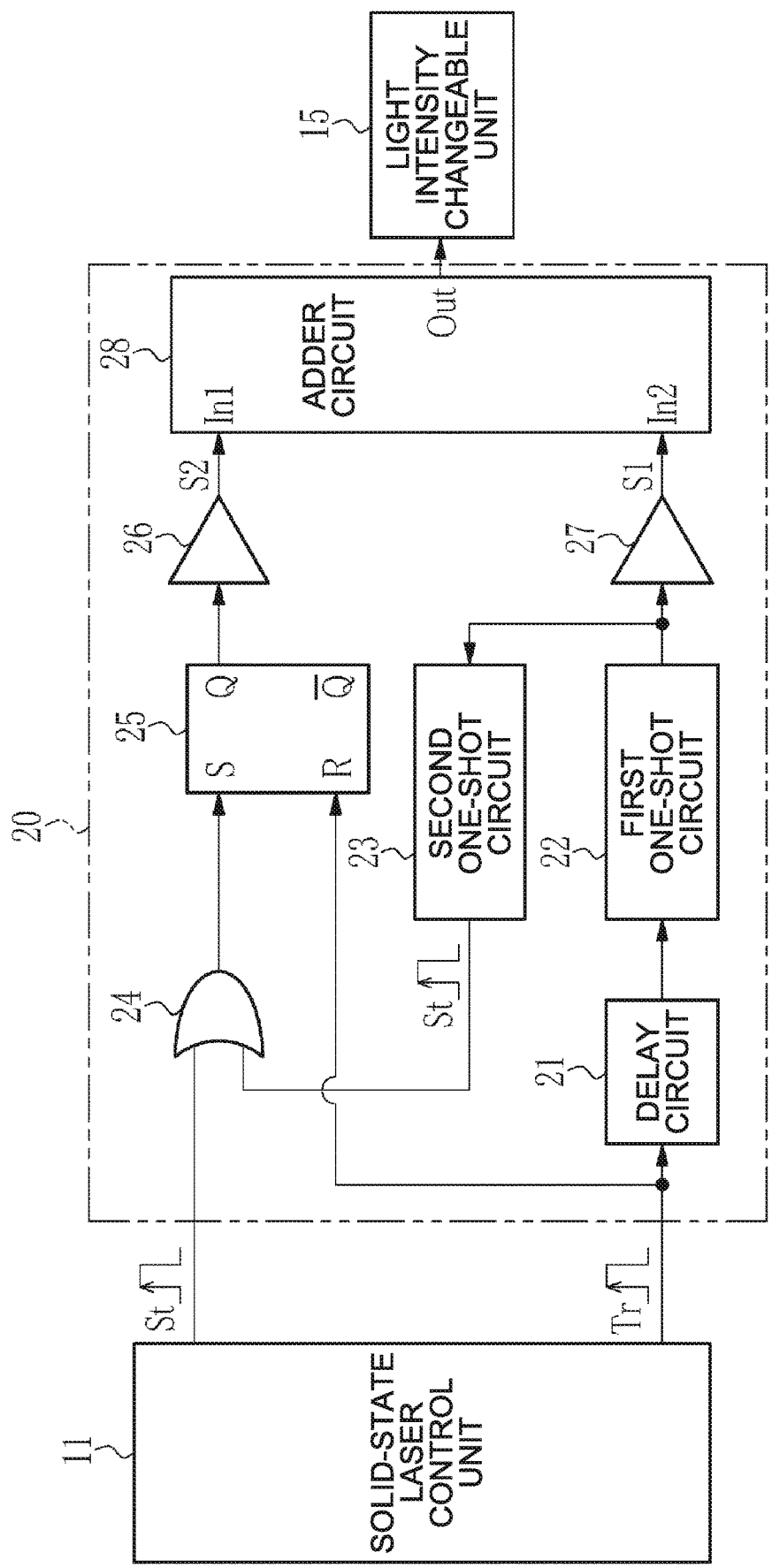
FIG. 6 schematically illustrates a configuration of a light intensity control unit 20.

FIG. 6 schematically illustrates a configuration of the light intensity control unit 20. In FIG. 6, the light intensity control unit 20 includes a delay circuit 21, a first one-shot circuit 22, a second one-shot circuit 23, an OR circuit 24, a flip-flop (FF) circuit 25, a first amplifier circuit 26, a second amplifier circuit 27, and an adder circuit 28.

The light intensity control unit 20 outputs a control signal to the light intensity changeable unit 15 to control the light intensity changeable unit 15. The light intensity changeable unit 15 changes the light intensity of the seed light $L_S$ input from the seed laser 14 and outputs it, based on the control signal input from the light intensity control unit 20.

In the solid-state laser device 10 of the comparative example, the one-shot circuit 17 is configured to output the pulse signal S to the light intensity changeable unit 15, according to the input of the external trigger signal Tr. Meanwhile, in the solid-state laser device 10a of the first embodiment, the light intensity control unit 20 outputs a first signal S1 and a second signal S2 to the light intensity changeable unit 15 as control signals, according to the input of the external trigger signal Tr. Specifically, each time the external trigger signal Tr is input, the light intensity control unit 20 outputs the first signal S1 to the light intensity changeable unit 15 after a certain time elapsed following the input of the external trigger signal Tr, and outputs the second signal S2 to the light intensity changeable unit 15 within a period from the output of the first signal S1 until the input of the next external trigger signal Tr.

The first signal S1 is a pulse signal to be used for generating the seed pulse light $L_P$ for allowing the amplifier 13 to generate the amplified light $L_A$, similar to the comparative example. The second signal S2 is used for generating suppression light $L_D$ for suppressing formation of inverted population after the amplified light $L_A$ is generated.

2.2 Operation

Figure 7:
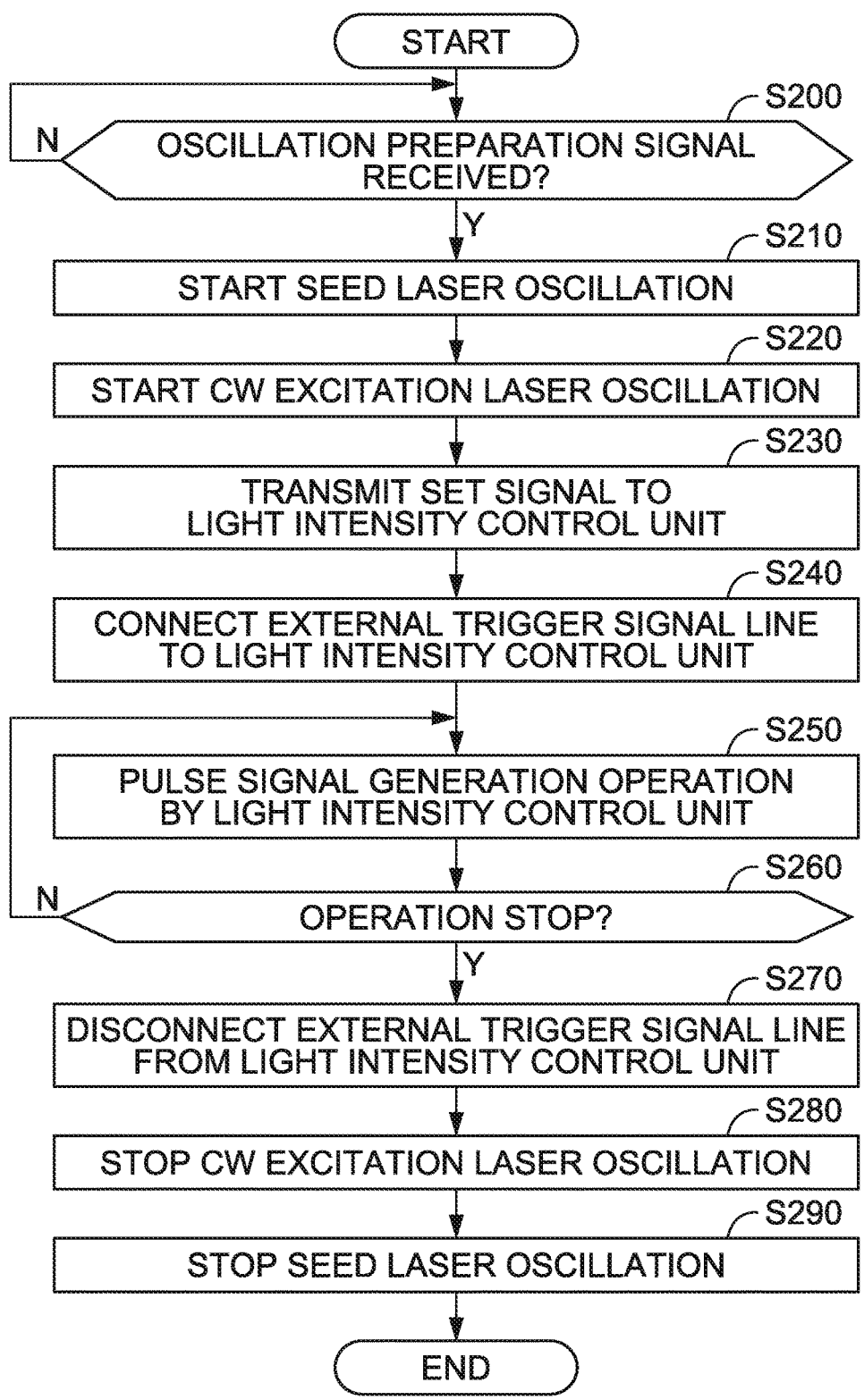
FIG. 7 is a flowchart illustrating an operation of the solid-state laser device 10a illustrated in FIGS. 5 and 6.

FIG. 7 is a flowchart illustrating an operation of the solid-state laser device 10a illustrated in FIGS. 5 and 6. FIGS. 8A to 8J are timing charts illustrating an operation of the solid-state laser device 10a. The solid-state laser control unit 11 included in the solid-state laser device 10a according to the first embodiment controls the operation of the solid-state laser device 10a through the processes described below.

First, at S200, the solid-state laser control unit 11 determines whether or not it has received the oscillation preparation signal Rd from the laser light irradiation device 2. When the solid-state laser control unit 11 has not received the oscillation preparation signal Rd (S200; NO), the solid-state laser control unit 11 waits until it receives the oscillation preparation signal Rd. Upon receipt of the oscillation preparation signal Rd (S200; YES), the solid-state laser control unit 11 proceeds to S210.

At S210, the solid-state laser control unit 11 controls the seed laser 14 to start a laser oscillation operation, and allows the seed laser 14 to output the seed light $L_S$ having a constant light intensity, as illustrated in FIG. 8B. The seed light $L_S$ output from the seed laser 14 is input to the light intensity changeable unit 15.

Next, at S220, the solid-state laser control unit 11 controls the CW excitation laser 12 to start laser oscillation operation, and allows the CW excitation laser 12 to output the CW excitation light $L_E$ having a constant light intensity, as illustrated in FIG. 8C. The CW excitation light $L_E$ output from the CW excitation laser 12 is reflected at a high rate by the dichroic mirror 16 to thereby be input to the amplifier 13, and optically excites the amplifier 13.

Next, at S230, the solid-state laser control unit 11 transmits the set signal St to the light intensity control unit 20. When the set signal St is input, the light intensity control unit 20 outputs the second signal S2 as illustrated in FIG. 8D. Specifically, as illustrated in FIG. 6, when the set signal St is input to the light intensity control unit 20, the set signal St is input to a set terminal S of the FF circuit 25 via the OR circuit 24. At that time, as a signal is not input to a reset terminal R of the FF circuit 25, the FF circuit 25 detects a rising edge of the set signal St input to the set terminal S, and becomes in a set state, as illustrated in FIG. 8I. When the FF circuit 25 is in a set state, an output signal value of an output terminal Q takes "1". The output signal of the output terminal Q is input to the first amplifier circuit 26.

The first amplifier circuit 26 amplifies a signal input from the output terminal Q of the FF circuit 25. When the signal value input from the output terminal Q of the FF circuit 25 is "1", the first amplifier circuit 26 amplifies it and outputs the second signal S2. An output signal of the first amplifier circuit 26 is input to a first input terminal In1 of the adder circuit 28, and an output signal of the second amplifier circuit 27 is input to a second input terminal In2. The adder circuit 28 adds the output signals of the first and second amplifier circuits 26 and 27 that are analog signals, and outputs the resultant from an output terminal Out.

As illustrated in FIG. 8J, when the second signal S2 is input from the first amplifier circuit 26 to the first input terminal In1 of the adder circuit 28, a signal value input to the second input terminal In2 from the second amplifier circuit 27 is "0". In that case, the second signal S2 is output from the output terminal Out of the adder circuit 28. Thus, the second signal S2 is output from the light intensity control unit 20 and is input to the light intensity changeable unit 15.

As the signal value input to the light intensity changeable unit 15 is larger, the light transmittance with respect to the seed light $L_S$ input from the seed laser 14 becomes larger. The second signal S2 has a smaller signal value than that of the first signal S1 described below. As such, when the second signal S2 is input, the light intensity changeable unit 15 has lower light transmittance than that at the time when the first signal S1 is input, and transmits part of the seed light $L_S$. Accordingly, when the second signal S2 is input to the light intensity control unit 20, the suppression light $L_D$ in which the light intensity of the seed light $L_S$ is lowered is output from the light intensity control unit 20 as illustrated in FIG. 8E. In the present embodiment, the suppression light $L_D$ is CW laser light having a constant light intensity.

The suppression light $L_D$ output from the light intensity control unit 20 passes through, at a high rate, the dichroic mirror 16 and is input to the amplifier 13. At that time, in the amplifier 13, while light excitation is caused by receiving the CW excitation light $L_E$, optical interaction is caused by an input of the suppression light $L_D$ whereby stimulated emission of light is caused. As such, formation of inverted population is suppressed as illustrated in FIG. 8F. Thereby, an increase in the amplification gain is suppressed. As illustrated in FIG. 8G, output light $L_B$ output from the amplifier 13 by the input of the suppression light $L_D$ has a low light intensity. The output light $L_B$ is output light secondarily generated by the suppression light $L_D$ in the amplifier 13. Accordingly, it is referred to as secondary light $L_B$ hereinafter.

The secondary light $L_B$ is input to the wavelength conversion unit 18. The wavelength conversion unit 18 has a wavelength conversion efficiency of a given value or higher with respect to incident light having a light intensity of a wavelength conversion threshold $I_C$ or larger, and has a wavelength conversion efficiency less than the given value with respect to incident light having a light intensity smaller than the wavelength conversion threshold $I_C$. As illustrated in FIG. 8G, the light intensity of the secondary light $L_B$ input to the wavelength conversion unit 18 is less than the wavelength conversion threshold $I_C$, and the wavelength conversion is suppressed. Accordingly, as illustrated in FIG. 8H, in the period during which the second signal S2 is output from the light intensity control unit 20, output of harmonic light from the wavelength conversion unit 18 is suppressed. In the first amplifier circuit 26, the amplification rate is set so as to generate the second signal S2 in which the light intensity of the secondary light $L_B$ generated in the amplifier 13 becomes less than the wavelength conversion threshold $I_C$.

Next, at S240, the solid-state laser control unit 11 connects the external trigger signal line, illustrated by a broken line in FIG. 5, to the light intensity control unit 20 to thereby enable the external trigger signal Tr to be input to the light intensity control unit 20. Accordingly, as illustrated in FIG. 8A, when the external trigger signal Tr is input from the laser light irradiation device 2 to the solid-state laser control unit 11, the external trigger signal Tr is input to the light intensity control unit 20 via the external trigger signal line.

At S250, when the external trigger signal Tr is input, the light intensity control unit 20 generates the first signal S1 after a certain time Td elapses, and outputs it to the light intensity changeable unit 15, as illustrated in FIG. 8D. Specifically, as illustrated in FIG. 6, when the external trigger signal Tr is input to the light intensity control unit 20, the external trigger signal Tr is input to the delay circuit 21 and also input to the reset terminal R of the FF circuit 25.

As illustrated in FIG. 8I, the FF circuit 25 detects a rising edge of the external trigger signal Tr input to the reset terminal R, and becomes in a reset state. When the FF circuit 25 is in a reset state, an output signal value of the output terminal Q takes "0". The output signal of the output terminal Q is input to the first input terminal In1 of the adder circuit 28 via the first amplifier circuit 26. At that time, a signal value input to the second input terminal In2 is "0". Accordingly, as illustrated in FIG. 8J, the signal value output from the output terminal Out of the adder circuit 28 is "0", which means a ground signal. The ground signal is output from the light intensity control unit 20 and is input to the light intensity changeable unit 15.

When the ground signal is input to the light intensity changeable unit 15, the light transmittance becomes almost "0", whereby transmission of the seed light $L_S$ input from the seed laser 14 is suppressed. Thereby, as illustrated in FIG. 8D, light is not input from the light intensity changeable unit 15 to the amplifier 13. Accordingly, the amplifier 13 receives the CW excitation light $L_E$ whereby the amplification gain is gradually increased, as illustrated in FIG. 8F.

On the other hand, the external trigger signal Tr input to the delay circuit 21 is delayed by the certain time Td by the delay circuit 21, and is output. The external trigger signal Tr output from the delay circuit 21 is input to the first one-shot circuit 22. The first one-shot circuit 22 detects a rising edge of the input external trigger signal Tr. When detecting the rising edge of the external trigger signal Tr, the first one-shot circuit 22 generates a pulse signal having a given pulse width Δt, and inputs it to the second amplifier circuit 27 and the second one-shot circuit 23.

The second amplifier circuit 27 amplifies the input pulse signal to generate the first signal S1 having a larger voltage value than that of the second signal S2, and outputs it. The first signal S1 has a pulse width Δt. The pulse width Δt is preferably in a range from 0.001 ns to 100 ns.

As illustrated in FIG. 8J, the first signal S1 is input to the second input terminal In2 of the adder circuit 28. At that time, a signal value input to the input terminal In1 is "0". In that case, the first signal S1 is output from the output terminal Out of the adder circuit 28. Thus, the first signal S1 is output from the light intensity control unit 20 and is input to the light intensity changeable unit 15. This means that the first signal S1 is input to the light intensity changeable unit 15 after the certain time Td elapsed from the time when the external trigger signal Tr is input to the light intensity control unit 20.

When the first signal S1 is input, the light intensity changeable unit 15 transmits the seed light $L_S$ input from the seed laser 14. Thereby, as illustrated in FIG. 8E, the seed pulse light $L_P$ having a pulse width corresponding to the first signal S1 is output from the light intensity changeable unit 15. The seed pulse light $L_P$ passes through, at a high rate, the dichroic mirror 16 and is input to the amplifier 13.

When the seed pulse light $L_P$ is input to the amplifier 13, light amplification is caused by stimulated emission, and the amplified light $L_A$ is output as illustrated in FIG. 8G. The light intensity of the amplified light $L_A$ depends on the magnitude of the amplification gain after the certain time Td elapsed from the time when the external trigger signal Tr is input to the light intensity control unit 20. The amplified light $L_A$ output from the amplifier 13 has a light intensity of the wavelength conversion threshold $I_C$ or larger, and is input to the wavelength conversion unit 18. When the amplified light $L_A$ is input to the wavelength conversion unit 18, the amplified light $L_A$ is converted to the harmonic light $L_H$ and is output, as illustrated in FIG. 8H. The harmonic light $L_H$ is made incident on an illumination optical system, not illustrated, of the laser light irradiation device 2, as ultraviolet pulse laser light.

Meanwhile, the second one-shot circuit 23 detects a falling edge of the pulse signal output from the first one-shot circuit 22. When detecting the falling edge of the pulse signal, the second one-shot circuit 23 generates the pulse-state set signal St, and outputs it. The set signal St is input to the set terminal S of the FF circuit 25 via the OR circuit 24. At that time, as a signal is not input to the reset terminal R of the FF circuit 25, the FF circuit 25 detects a rising edge of the set signal St input to the set terminal S, and becomes in a set state, as illustrated in FIG. 8I.

As a result, the second signal S2 is output from the output terminal Out of the adder circuit 28, similar to the case of S230. Then, when the second signal S2 is input to the light intensity control unit 20, the suppression light $L_D$ is output from the light intensity control unit 20 as illustrated in FIG. 8E. With the suppression light $L_D$, an increase of the amplification gain of the amplifier 13 is suppressed, and the secondary light $L_B$ is output from the amplifier 13. As the secondary light $L_B$ has a light intensity smaller than the wavelength conversion threshold $I_C$, wavelength conversion in the wavelength conversion unit 18 is suppressed, and output of the harmonic light is suppressed.

At S260, the solid-state laser control unit 11 determines whether or not to stop operation of the solid-state laser device 10a. For example, when the solid-state laser control unit 11 receives a stop signal, not illustrated, from the laser light irradiation device 2, the solid-state laser control unit 11 determines to stop operation of the solid-state laser device 10a. A stop signal is input to the solid-state laser control unit 11 when a failure occurs in the solid-state laser device 10a or at the time of stopping laser oscillation of the solid-state laser device 10a.

When determining not to stop operation of the solid-state laser device 10a (S260; NO), the solid-state laser control unit 11 keeps the external trigger signal line connected with the light intensity control unit 20 to thereby allow the external trigger signal Tr to be input to the light intensity control unit 20. The operation of generating the first and second signals S1 and S2 by the light intensity control unit 20 at S250 and the laser oscillation operation accompanying thereto are performed each time the external trigger signal Tr is input to the solid-state laser control unit 11.

When determining to stop operation of the solid-state laser device 10a (S260; YES), the solid-state laser control unit 11 proceeds to S270. At S270, the solid-state laser control unit 11 disconnects the external trigger signal line from the light intensity control unit 20. Next, at S280, the solid-state laser control unit 11 stops the laser oscillation operation of the CW excitation laser 12. Then, at S290, the solid-state laser control unit 11 stops the laser oscillation operation of the seed laser 14.

The certain time Td that is a delay time of a signal by the delay circuit 21 is set to be shorter than the pulse interval T of the external trigger signals Tr. The certain time Td is preferably in a range from 10 μs to 1,000 μs. The certain time Td is a fixed value rather than a value that varies according to the pulse interval T of the external trigger signals Tr. The fixed value may be set to the delay circuit 21 by the solid-state laser control unit 11 according to the pulse energy of the harmonic light $L_H$ as the pulse laser light output from the solid-state laser device 10a to the laser light irradiation device 2. For example, the solid-state laser control unit 11 sets the fixed value to be a larger value as the required pulse energy of the harmonic light $L_H$ output from the solid-state laser device 10a is higher.

2.3 Effect

According to the solid-state laser device 10a of the first embodiment, an increase of the amplification gain of the amplifier 13 begins at the point of time when the external trigger signal Tr is input to the solid-state laser device 10a, and the amplified light $L_A$ is generated by the amplification gain after the certain time Td elapsed. Accordingly, in the first embodiment, under a condition that the relationship of "T>Td" is satisfied, the light intensity of the amplified light $L_A$ is constant regardless of the pulse interval T of the external trigger signal Tr. This means that the light intensity and the pulse energy of the pulse laser light output to the laser light irradiation device 2 are constant regardless of the pulse interval T.

Further, in the first embodiment, the light intensity and the pulse energy of the pulse laser light, at the head of the burst output to the laser light irradiation device 2 immediately after the start of the burst period after the pause period of the burst operation, do not increase. This prevents the non-linear crystal included in the wavelength conversion unit 18 from being damaged. Further, in the case where the amplifier 13 is an optical fiber amplifier, a damage of the optical fiber is suppressed.

2.4 First and Second Signal Setting Conditions

In the first embodiment, while the suppression light $L_D$ is set to have a light intensity lower than that of the seed pulse light $L_P$, it is only necessary that the light intensity of the suppression light $L_D$ may have magnitude by which light excitation generated by the amplifier 13 receiving the CW excitation light $L_E$ after generation of the amplified light $L_A$ is consumed and formation of inverted population can be suppressed.

Specifically, when the light intensity of the seed pulse light $L_P$ output from the light intensity changeable unit 15 according to the first signal S1 is represented by $I_P$, and the light intensity of the suppression light $L_D$ output from the light intensity changeable unit 15 according to the second signal S2 is represented by $I_D$, it is preferable that the light intensity ratio $I_D/I_P$ satisfies the following Expression (1):

$$0.1 \leq I_D/I_P \leq 1.0 \tag{1}$$

This means that when the voltage value of the first signal S1 generated by the light intensity control unit 20 is represented by $V_{S1}$, and the voltage value of the second signal S2 is represented by $V_{S2}$, it is preferable that the voltage ratio $V_{S2}/V_{S1}$ satisfies the following Expression (2):

$$0.1 \le V_{S2}/V_{S1} \le 1.0 \qquad (2)$$

In the first embodiment, while the light intensity control unit 20 includes the first and second amplifier circuits 26 and 27 and the adder circuit 28, when $V_{S1}=V_{S2}$, a configuration described below is also possible. For example, with respect to the configuration of the light intensity control unit 20 illustrated in FIG. 6, an OR circuit is added, the first and second amplifier circuits 26 and 27 are made common, and the adder circuit 28 is deleted. An output from the output terminal Q of the FF circuit 25 and an output from the first one-shot circuit 22 are input to the OR circuit. An output of the OR circuit is input to the common amplifier circuit.

Further, in the first embodiment, the light intensity control unit 20 outputs a ground signal to the light intensity changeable unit 15 during a period after the external trigger signal Tr is input until the certain time Td elapsed, to thereby make the light transmittance of the light intensity changeable unit 15 almost "0". It is only necessary that the light intensity control unit 20 allows the light intensity changeable unit 15 to suppress transmission of the seed light $L_S$ so as to increase the amplification gain of the amplifier 13. The signal value input to the light intensity changeable unit 15 and the light transmittance of the light intensity changeable unit 15 may not be "0".

2.5 Definition of Wavelength Conversion Threshold

In the wavelength conversion unit 18, the wavelength conversion efficiency of the incident light, from the amplifier 13, to the harmonic light depends on the light intensity of the incident light. The wavelength conversion efficiency is lower as the light intensity of the incident light is lower. The wavelength conversion threshold $I_C$ is defined as a light intensity of incident light in which the wavelength conversion efficiency takes a given value. It is preferable that the given value is in a range from 1% to 2%, for example. It is also preferable that the given value is in a range from 0% to 0.01%.

The wavelength conversion threshold $I_C$ may be defined in the wavelength conversion unit 18 based on a ratio of a second light intensity that is the light intensity of harmonic light generated according to the second signal S2 to a first light intensity that is the light intensity of the harmonic light $L_H$ generated according to the first signal S1. For example, the wavelength conversion threshold $I_C$ may be defined as a light intensity in which the ratio of the second light intensity to the first light intensity is in a range from 0% to 10%.

3. Modifications of Light Intensity Control Unit

Various modifications of the light intensity control unit 20 can be made. Hereinafter, modifications of the light intensity control unit 20 will be described.

3.1 First Modification

Next, a first modification of the light intensity control unit 20 will be described. As illustrated in FIG. 8D, the light intensity control unit 20 of the first embodiment is configured to generate the second signal S2 immediately after generating the first signal S1. As the first modification, description will be given on the case where the light intensity control unit 20 is configured to generate the second signal S2 after a predetermined time elapsed from generation of the first signal S1.

Figure 9:
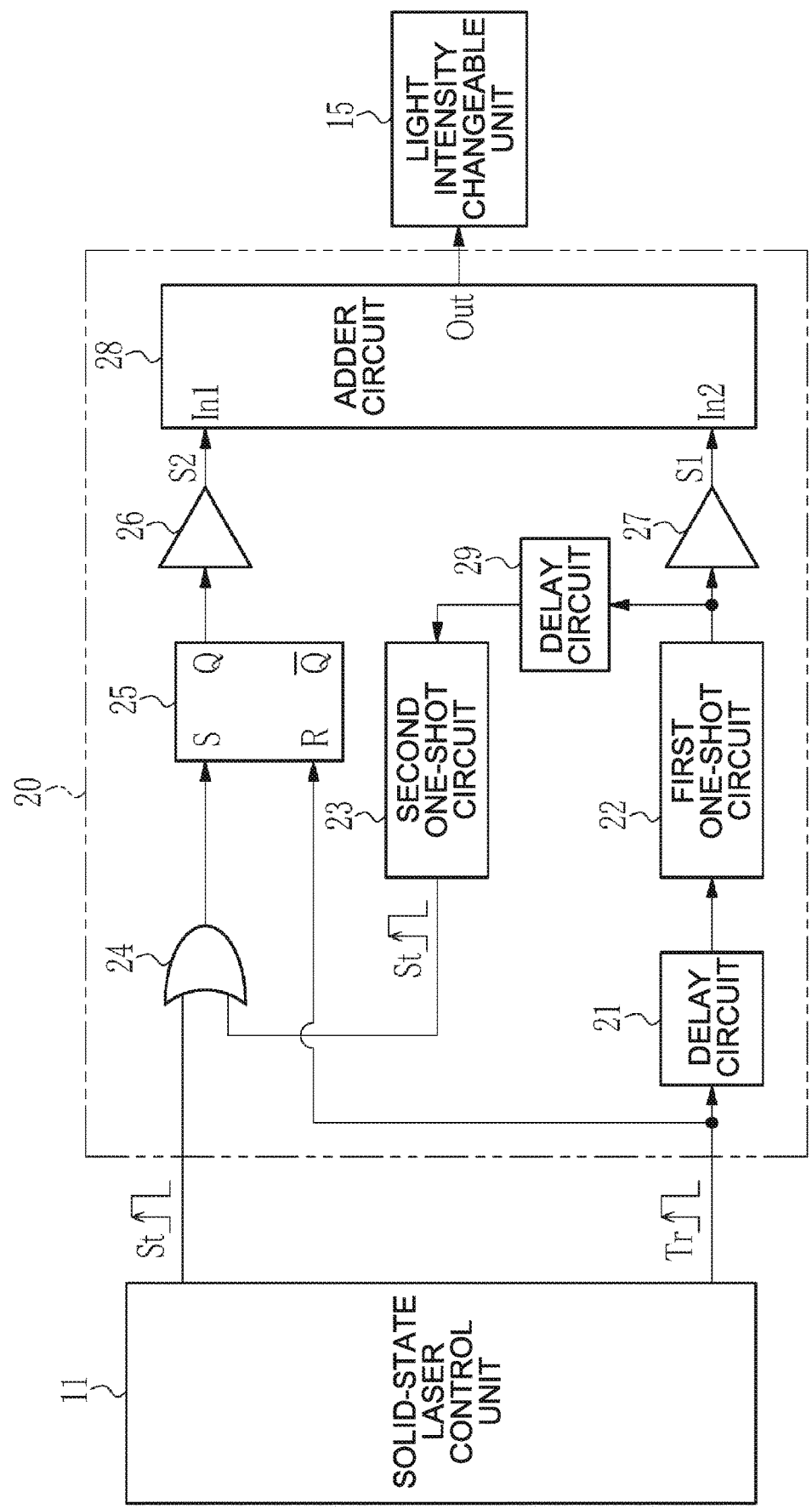
FIG. 9 illustrates a configuration of the light intensity control unit 20 according to a first modification.

FIG. 9 illustrates a configuration of the light intensity control unit 20 according to the first modification. In FIG. 9, the light intensity control unit 20 according to the first modification includes a delay circuit 29, in addition to the constituent elements of the light intensity control unit 20 of the first embodiment illustrated in FIG. 6. The delay circuit 29 is disposed between the first one-shot circuit 22 and the second one-shot circuit 23, and delays the input timing of a pulse signal to the second one-shot circuit 23 by a given period of time. The delay circuit 29 may be disposed between the second one-shot circuit 23 and the OR circuit 24. The other configurations and operations of the light intensity control unit 20 according to the first modification are similar to those of the light intensity control unit 20 of the first embodiment.

3.2 Second Modification

Next, a second modification of the light intensity control unit 20 will be described. In the first embodiment, the light intensity control unit 20 is configured of a logical circuit. Meanwhile, as the second modification, description will be given on the case where the light intensity control unit 20 is configured of an integrated circuit capable of programming a control program such as a field programmable gate array (FPGA).

Figure 10:
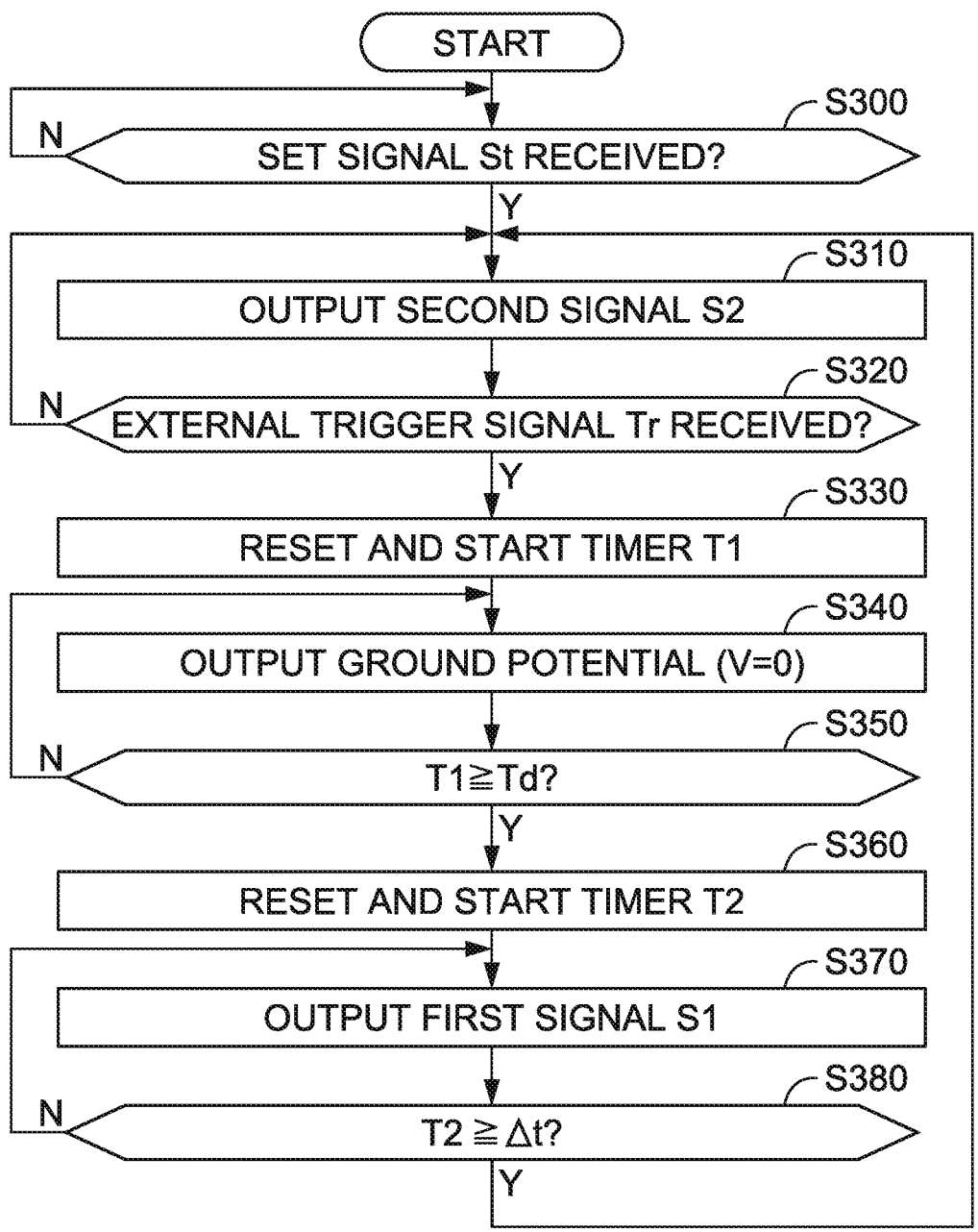
FIG. 10 is a flowchart illustrating an operation by a control program incorporated in the light intensity control unit 20 according to a second modification.

FIG. 10 is a flowchart illustrating an operation of a control program incorporated in the light intensity control unit 20 according to the second modification. The light intensity control unit 20 performs the processes described below based on the control program.

First, at S300, the light intensity control unit 20 determines whether or not the set signal St has been received from the solid-state laser control unit 11. When the light intensity control unit 20 has not received the set signal St (S300; NO), the light intensity control unit 20 waits until it receives the set signal St. Upon receipt of the set signal St (S300; YES), the light intensity control unit 20 proceeds to S310.

At S310, the light intensity control unit 20 outputs the second signal S2 to the light intensity changeable unit 15. Then, at S320, the light intensity control unit 20 determines whether or not it has received the external trigger signal Tr from the solid-state laser control unit 11. When the external trigger signal Tr has not been received (S320; NO), the light intensity control unit 20 continues outputting the second signal S2 of S310. Upon receipt of the external trigger signal Tr (S320; YES), the light intensity control unit 20 stops outputting the second signal S2, and proceeds to S330.

At S330, the light intensity control unit 20 resets a timer T1 and starts time measuring. Next, at S340, the light intensity control unit 20 outputs a ground signal (0V) to the light intensity changeable unit 15. Then, at S350, the light intensity control unit 20 determines whether or not an elapsed time T1 from the start of time measuring at S330 reaches the certain time Td. When the elapsed time T1 does not reach the certain time Td (S350; NO), the light intensity control unit 20 continues outputting the ground signal of S340. When the elapsed time T1 reaches the certain time Td (S350; YES), the light intensity control unit 20 stops outputting the ground signal, and proceeds to S360.

At S360, the light intensity control unit 20 resets a timer T2 and starts time measuring. Next, at S370, the light intensity control unit 20 outputs the first signal S1 to the light intensity changeable unit 15. Then, at S380, the light intensity control unit 20 determines whether or not an elapsed time T2 from the start of time measuring at S360 reaches a time corresponding to the pulse width Δt. When the elapsed time T2 does not reach the time corresponding to the pulse width Δt (S380; NO), the light intensity control unit 20 continues outputting the first signal S1 of S370. When the elapsed time T2 reaches the time corresponding to the pulse width Δt (S380; YES), the light intensity control unit 20 stops outputting the first signal S1, and proceeds to S310. After this process, the light intensity control unit 20 repeats the processes of S310 to S380.

The other configurations and operations of the light intensity control unit 20 according to the second modification are similar to those of the light intensity control unit 20 of the first embodiment.

As described above, the light intensity control unit 20 according to the second modification performs the aforementioned processes based on the control program to thereby enable the first and second signals S1 and S2 to be output to the light intensity changeable unit 15 at the timing that is the same as that of the light intensity control unit 20 of the first embodiment. In the case of generating the second signal S2 after the given time elapsed from generation of the first signal S1 as in the case of the first modification, it is only necessary to move to S310 after the given time elapsed from the point of time when YES determination is made at S380.

3.3 Third Modification

Next, a third modification of the light intensity control unit 20 will be described. In the first embodiment, there is a possibility that inverted population of the amplifier 13 is not completely consumed by the seed pulse light $L_P$ generated by the light intensity changeable unit 15 based on the first signal S1, and that the amplification gain remains after the generation of the amplified light $L_A$. When the amplification gain remaining after the generation of the amplified light $L_A$ is large, there is a possibility that the suppression light $L_H$ generated by the light intensity changeable unit 15 based on the second signal S2 is amplified, and that the light intensity of the resultant secondary light $L_B$ exceeds the wavelength conversion threshold $I_C$. Accordingly, in the first embodiment, wavelength conversion may be caused in the wavelength conversion unit 18 after the harmonic light $L_H$ is output corresponding to the first signal S1, and harmonic light accompanying thereto may be output.

FIGS. 11A to 11H are timing charts illustrating an operation of the solid-state laser device 10a including the light intensity control unit 20 according to the third modification. The light intensity control unit 20 according to the third modification is configured to, after outputting the first signal S1 to the light intensity changeable unit 15, gradually increase the voltage value of the second signal S2 to be output to the light intensity changeable unit 15 during a certain period $T_C$, as illustrated in FIG. 11D. Thereby, in the suppression light $L_D$ generated by the light intensity changeable unit 15, the light intensity is gradually increased during the certain period Tc after generation of the seed pulse light $L_P$ as illustrated in FIG. 11E.

The other configurations and operations of the light intensity control unit 20 according to the third modification are similar to those of the light intensity control unit 20 of the first embodiment.

In the solid-state laser device 10a including the light intensity control unit 20 according to the third modification, when the amplification gain remains after generation of the amplified light $L_A$, the remaining amplification gain is gradually decreased by the suppression light $L_D$ as illustrated in FIG. 11F. Accordingly, as illustrated in FIG. 11G, the suppression light $L_D$ is amplified by the amplification gain remaining after the generation of the amplified light $L_A$, whereby the light intensity of the secondary light $L_B$ is prevented from exceeding the wavelength conversion threshold $I_C$. Consequently, as illustrated in FIG. 11H, it is possible to prevent wavelength conversion from being caused in the wavelength conversion unit 18 after the harmonic light $L_H$ is output corresponding to the first signal S1, and to prevent harmonic light accompanying thereto from being output.

3.4 Fourth Modification

Next, a fourth modification of the light intensity control unit 20 will be described. The light intensity control unit 20 of the first embodiment outputs the second signal S2 having a constant voltage value. Meanwhile, as the fourth modification, description will be given on the case where the light intensity control unit 20 is configured to output the second signal S2 configured of a continuous pulse.

Figure 12:
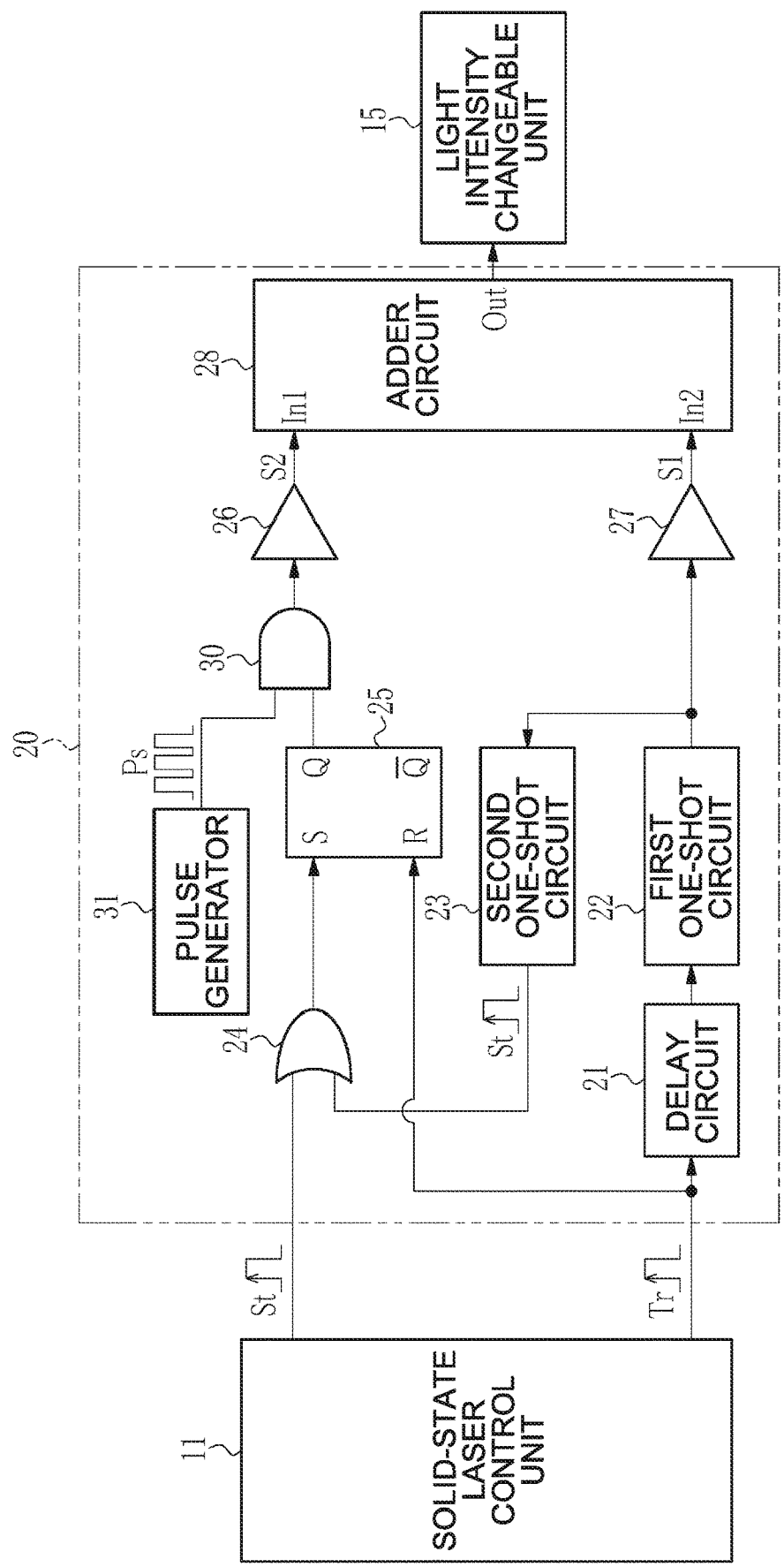
FIG. 12 illustrates a configuration of the light intensity control unit 20 according to a fourth modification.

FIG. 12 illustrates a configuration of the light intensity control unit 20 according to the fourth modification. In FIG. 12, the light intensity control unit 20 according to the fourth modification includes an AND circuit 30 and a pulse generator 31, in addition to the constituent elements of the light intensity control unit 20 of the first embodiment illustrated in FIG. 6. The AND circuit 30 is disposed between the FF circuit 25 and the first amplifier circuit 26. A first input terminal of the AND circuit 30 is connected with the output terminal Q of the FF circuit 25 via a signal line. A second input terminal of the AND circuit 30 is connected with the pulse generator 31 via a signal line. An output terminal of the AND circuit 30 is connected with the input terminal of the first amplifier circuit 26 via a signal line.

The pulse generator 31 generates a continuous pulse signal Ps having a given pulse period Ts. The AND circuit 30 outputs a logical product of an output signal value of the output terminal Q of the FF circuit 25 and the continuous pulse signal Ps. Accordingly, the AND circuit 30 outputs "0" when the output signal value of the output terminal Q is "0", while the AND circuit 30 outputs the continuous pulse signal Ps when the output signal value of the output terminal Q is "1". The continuous pulse signal Ps is input to the first amplifier circuit 26, and the second signal S2 configured of continuous pulses having the pulse period Ts is generated by the first amplifier circuit 26.

FIGS. 13A to 13J are timing charts illustrating an operation of the solid-state laser device 10a including the light intensity control unit 20 according to the fourth modification. As illustrated in FIG. 13D, the light intensity control unit 20 of the fourth modification outputs the second signal S2 configured of continuous pulses to the light intensity changeable unit 15, after outputting the first signal S1. As illustrated in FIG. 13E, the suppression light $L_D$ output from the light intensity changeable unit 15 based on the second signal S2 becomes pulse-state pulse laser light. As illustrated in FIG. 13F, with the pulse-state suppression light $L_D$, an increase of the amplification gain of the amplifier 13 is suppressed. As described above, when the increase of the amplification gain is suppressed, the light intensity of the secondary light $L_B$ becomes smaller than the wavelength conversion threshold $I_C$ of the wavelength conversion unit 18 as illustrated in FIG. 13G, whereby the wavelength conversion with respect to the secondary light $L_B$ is suppressed.

As the pulse period Ts of the continuous pulse signal Ps is larger, the amount of increase of the amplification gain illustrated in FIG. 13F is larger. Thereby, the pulse period Ts must be a certain value or lower. It is preferable that the pulse period Ts is 1/10 of the certain time Td or shorter, and it is more preferable that it is 1/100 of the certain time Td or shorter.

The other configurations and operations of the light intensity control unit 20 according to the fourth modification are similar to those of the light intensity control unit 20 of the first embodiment.

3.5 Fifth Modification

Next, a fifth modification of the light intensity control unit 20 will be described. In the fourth modification, the light intensity control unit 20 is configured of a logical circuit. Meanwhile, as the fifth modification, description will be given on the case where the light intensity control unit 20 according to the fourth modification is configured of an integrated circuit capable of programming a control program such as a field programmable gate array (FPGA).

A flowchart of a control program incorporated in the light intensity control unit 20 of the fifth modification is similar to the flowchart illustrated in FIG. 10 according to the second modification. In the fifth modification, at S310, the light intensity control unit 20 is controlled to output the second signal S2 as the continuous pulse signal Ps.

The other configurations and operations of the light intensity control unit 20 according to the fifth modification are similar to those of the light intensity control unit 20 of the fourth modification.

3.6 Sixth Modification

Next, a sixth modification of the light intensity control unit 20 will be described. In the fourth and fifth modifications, voltage values of respective pulses output as the second signal S2 by the light intensity control unit 20 are constant. Even in the fourth and fifth modifications, when the amplification gain remaining after the generation of the amplified light $L_A$ is large, there is a possibility that the suppression light $L_D$ generated by the light intensity changeable unit 15 based on the second signal S2 is amplified, and that the light intensity of the secondary light $L_B$ exceeds the wavelength conversion threshold $I_C$.

Figure 14A:
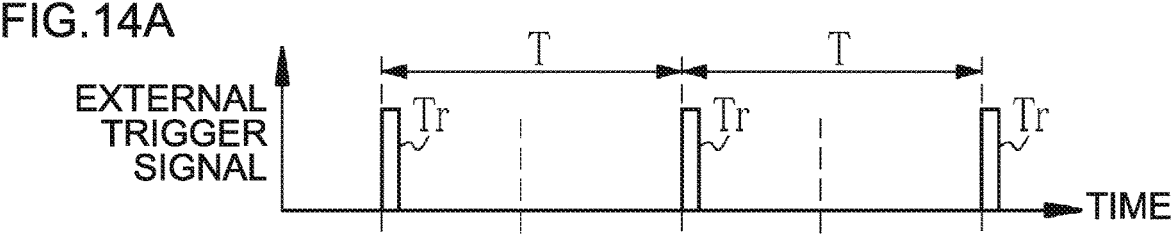
FIGS. 14A to 14H are timing charts illustrating an operation of the solid-state laser device 10a including the light intensity control unit 20 according to a sixth modification.
Figure 14B:
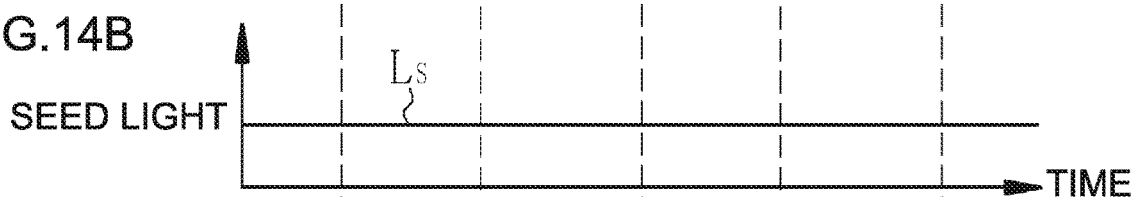
Figure 14C:
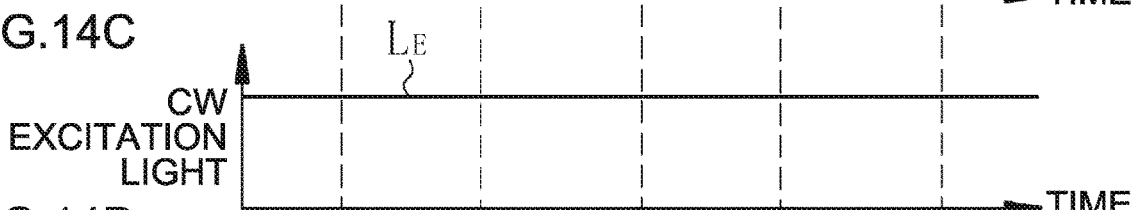
Figure 14D:
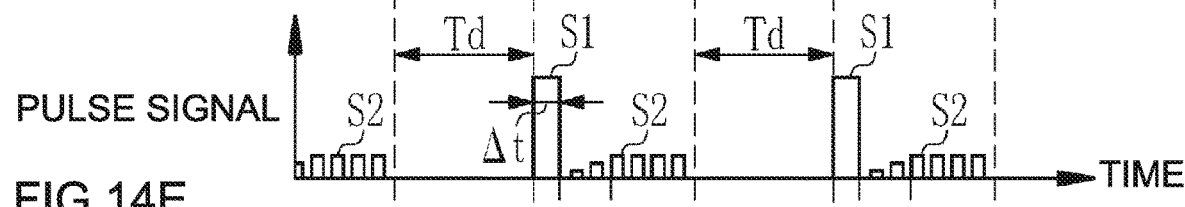
Figure 14E:
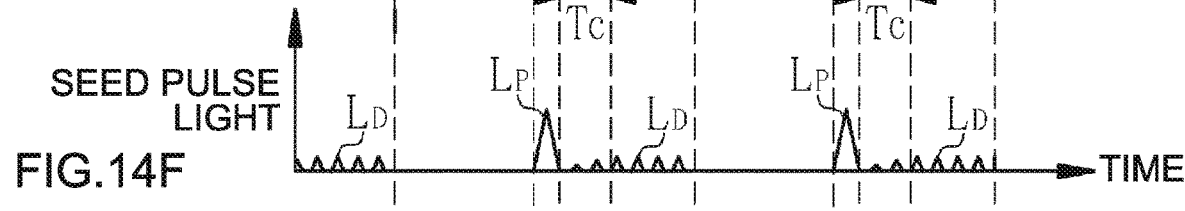

FIGS. 14A to 14H are timing charts illustrating an operation of the solid-state laser device 10a including the light intensity control unit 20 according to the sixth modification. The light intensity control unit 20 according to the sixth modification is configured to, after outputting the first signal S1 to the light intensity changeable unit 15, gradually increase the voltage value of each pulse of the second signal S2 to be output to the light intensity changeable unit 15 during the certain period Tc, as illustrated in FIG. 14D. Thereby, in the pulse-state suppression light $L_D$ generated by the light intensity changeable unit 15, the light intensity is gradually increased during the certain period Tc after generation of the seed pulse light $L_P$, as illustrated in FIG. 14E.

The other configurations and operations of the light intensity control unit 20 according to the sixth modification are similar to those of the light intensity control unit 20 of the fourth modification.

Figure 14F:
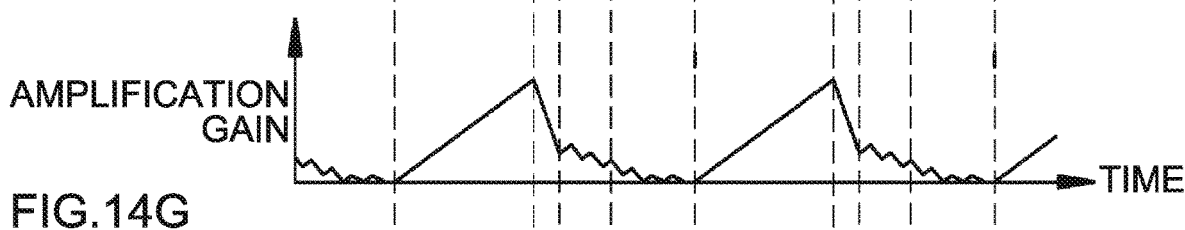
Figure 14G:
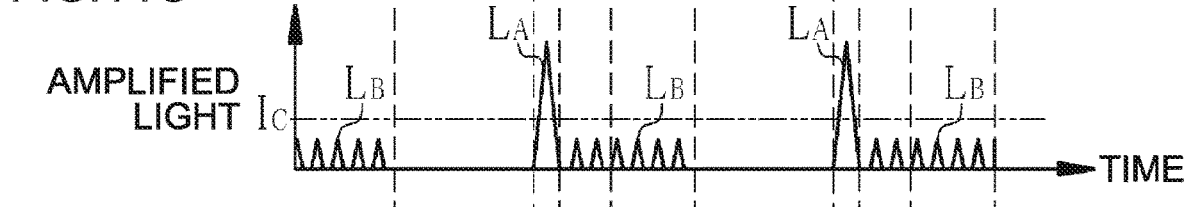
Figure 14H:
Figure 15A:
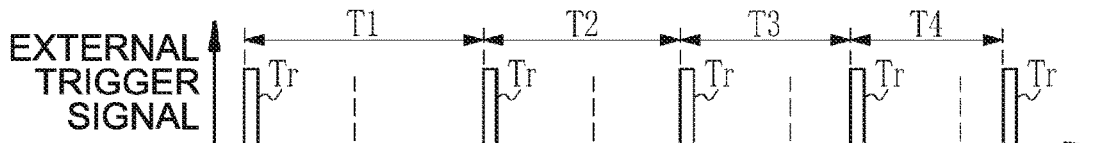
FIGS. 15A to 15H are timing charts illustrating an operation of the solid-state laser device 10a in the case where a pulse interval of external trigger signals is acyclic.
Figure 15B:
Figure 15C:
Figure 15D:
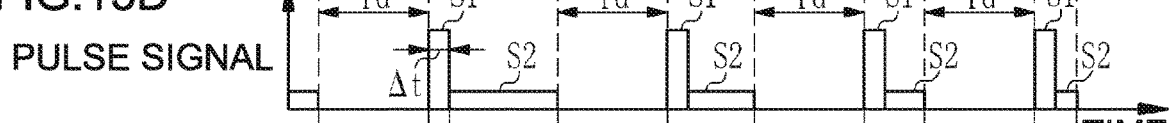
Figure 15E:
Figure 15F:
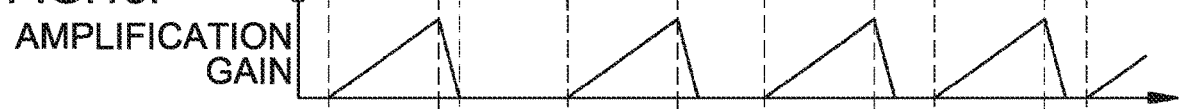
Figure 15G:
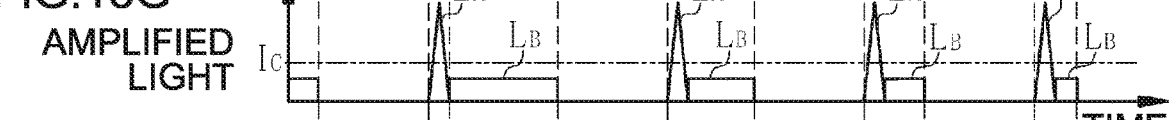
Figure 15H:

In the solid-state laser device 10a including the light intensity control unit 20 according to the sixth modification, when the amplification gain remains after generation of the amplified light $L_A$, the remaining amplification gain is gradually decreased by the suppression light $L_D$ as illustrated in FIG. 14F. Accordingly, as illustrated in FIG. 14G, the suppression light $L_D$ is amplified by the amplification gain remaining after the generation of the amplified light $L_A$, whereby the light intensity of the secondary light $L_B$ is prevented from exceeding the wavelength conversion threshold $I_C$. Consequently, it is possible to prevent wavelength conversion from being caused in the wavelength conversion unit 18 after the harmonic light $L_H$ is output corresponding to the first signal S1, and to prevent harmonic light accompanying thereto from being output, as illustrated in FIG. 14H.

4. Case where Pulse Interval of External Trigger Signal is Acyclic

The first embodiment and the respective modifications of the present disclosure illustrate an example in which, during the burst period, the external trigger signals Tr are cyclically input from the laser light irradiation device 2 to the solid-state laser control unit 11 with a constant pulse interval T. However, the pulse interval T may be acyclic.

FIGS. 15A to 15H are timing charts in the case where the pulse interval in the burst period of the external trigger signals Tr output from the laser light irradiation device 2 to the solid-state laser control unit 11 is acyclic, in the solid-state laser device 10 of the first embodiment. In this drawing, pulse intervals T1 to T4 of the external trigger signals Tr have a relation satisfying T1>T2>T3>T4. However, the present invention is not limited to this relation. It is only necessary that the pulse interval of the external trigger signal Tr is larger than the certain time Td.

In the solid-state laser device 10a, even in the case where the pulse interval of the external trigger signals Tr is acyclic, the period in which the amplification gain is increased in the amplifier 13 is the certain time Td, similar to the case where the pulse interval is constant. Accordingly, the light intensity of the amplified light $L_A$ is constant. This means that the light intensity and the pulse energy of the pulse laser light output to the laser light irradiation device 2 are constant even when the pulse interval is acyclic.

Even in the respective modifications, the light intensity and the pulse energy of the pulse laser light output to the laser light irradiation device 2 are also constant, even when the pulse interval of the external trigger signals Tr is acyclic.

5. Exemplary Configuration of Light Intensity Changeable Unit

The light intensity changeable unit 15 can be configured in various ways. Specific exemplary configurations of the light intensity changeable unit 15 will be described below.

5.1 First Exemplary Configuration

Next, a specific configuration of an optical shutter 100 applicable as the light intensity changeable unit 15 will be described with reference to FIG. 16.

5.1.1 Configuration

Figure 16:
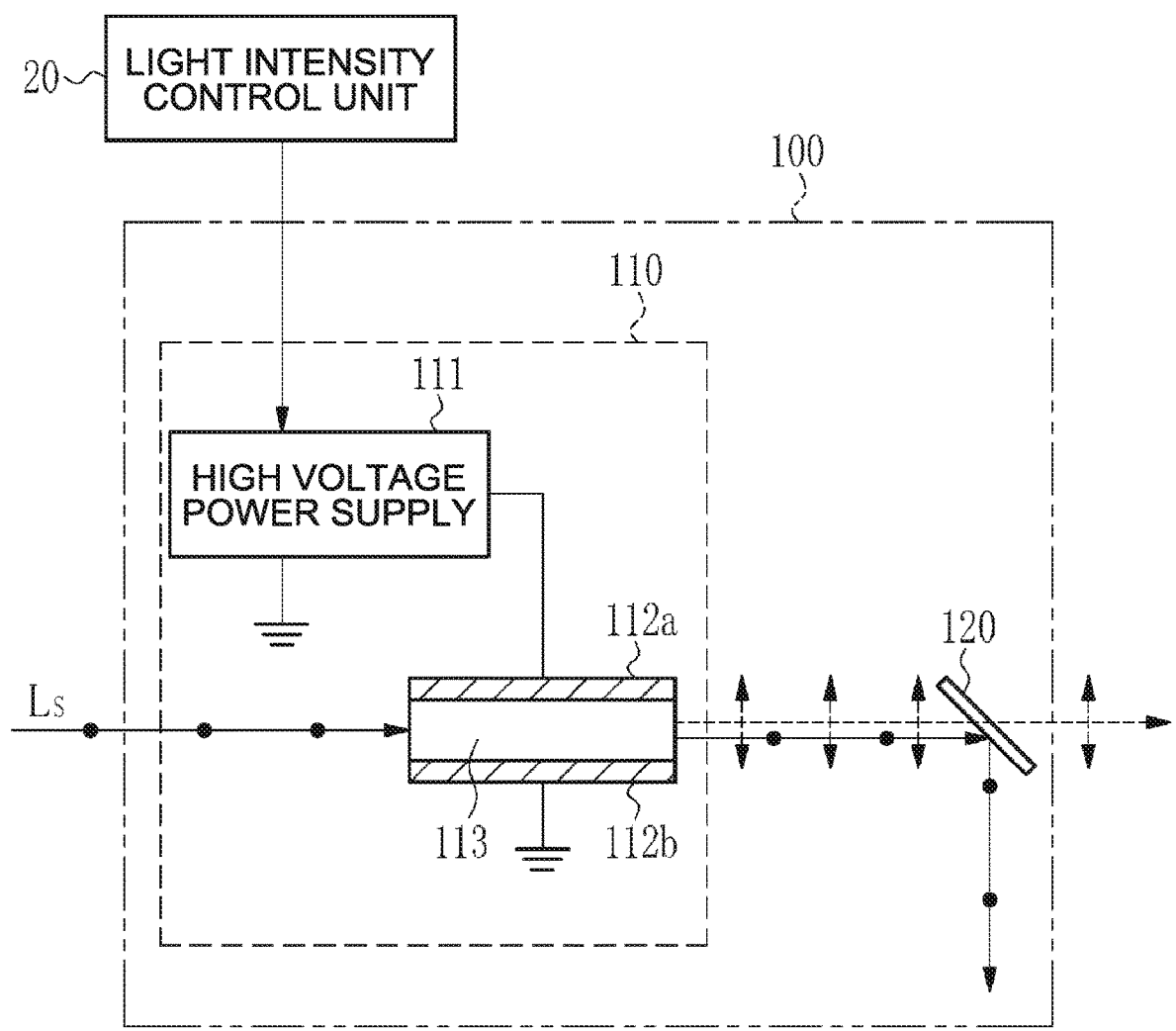
FIG. 16 illustrates an exemplary configuration of an optical shutter 100.

FIG. 16 illustrates an exemplary configuration of the optical shutter 100. The optical shutter 100 includes a Pockels cell 110 and a polarizer 120. The Pockels cell 110 includes a high-voltage power supply 111, a first electrode 112a, a second electrode 112b, and an electro optical crystal 113. The first electrode 112a and the second electrode 112b are disposed opposite to each other, with the electro optical crystal 113 being interposed between them. The first electrode 112a is connected with the high-voltage power supply 111. The second electrode 112b is grounded.

In the case of applying the optical shutter 100 as the light intensity changeable unit 15, the high-voltage power supply 111 is controlled by the light intensity control unit 20. The seed light $L_S$ output from the seed laser 14 is incident on the electro optical crystal 113. The output light from the optical shutter 100 is made incident on the amplifier 13 via the dichroic mirror 16. The seed light $L_S$ made incident on the electro optical crystal 113 is linearly polarized light in which the polarization direction is vertical to the sheet surface.

5.1.2 Operation

The high-voltage power supply 111 applies high voltage between the first electrode 112a and the second electrode 112b, according to a voltage value of a control signal input from the light intensity control unit 20. When high voltage corresponding to the maximum voltage value of the control signal is applied between the first electrode 112a and the second electrode 112b, the electro optical crystal 113 exhibits an action equivalent to a λ/2 plate with respect to the incident light.

When high voltage is not applied to the electro optical crystal 113, the seed light $L_S$ of the linearly polarized light in which the polarization direction is vertical to the sheet surface passes through the electro optical crystal 113 in the polarized state as it is, and is reflected by the polarizer 120. In that case, the seed light $L_S$ is not output from the optical shutter 100. This means that, in that case, the light transmittance of the optical shutter 100 with respect to the seed light $L_S$ is almost 0%. In FIG. 16, regarding the linearly polarized light in which the polarization direction is vertical to the sheet surface, the optical path thereof is indicated by solid lines, and the polarization direction is indicated by black dots.

Meanwhile, when high voltage corresponding to the maximum voltage value of the control signal is applied to the electro optical crystal 113, the phase of the seed light $L_S$ is shifted by λ/2 when it passes through the electro optical crystal 113, and the polarization direction is converted to a direction including the sheet surface. In that case, the seed light $L_S$ passes through the polarizer 120 and is output from the optical shutter 100. This means that, in that case, the light transmittance of the optical shutter 100 with respect to the seed light $L_S$ is almost 100%. In FIG. 16, regarding the linearly polarized light in which the polarization direction is a direction including the sheet surface, the optical path thereof is indicated by a broken line, and the polarization direction is indicated by arrows.

Further, by changing the control signal applied between the first electrode 112a and the second electrode 112b, the light transmittance of the optical shutter 100 with respect to the seed light $L_S$ can be changed between 0% and 100%.

In the first embodiment and the respective modifications, the first signal S1, the second signal S2, or the ground signal (0V) is input as the control signal from the light intensity control unit 20 to the optical shutter 100. The voltage value $V_{S1}$ of the first signal S1 corresponds to the maximum voltage value. When the voltage value $V_{S1}$ is input to the high-voltage power supply 111, the light transmittance of the optical shutter 100 becomes almost 100%. Meanwhile, the voltage value $V_{S2}$ of the second signal S2 is lower than the maximum voltage value. Therefore, when the voltage value $V_{S2}$ is input to the high-voltage power supply 111, the light transmittance of the optical shutter 100 takes a value that is less than 100% and corresponds to the voltage value $V_{S2}$. Further, when the ground signal is input to the high-voltage power supply 111, the light transmittance of the optical shutter 100 becomes almost 0%.

This means that the seed pulse light $L_P$ is generated when the first signal S1 is input from the light intensity control unit 20 to the optical shutter 100, and the suppression light $L_D$ is generated when the second signal S2 is input.

The Pockels cell 110 has responsiveness of about 1 ns, and is able to change the light transmittance at high speed. As the optical shutter 100, an acousto-optic element may be used. As the acousto-optic element has responsiveness of about several 100 ns, it is applicable as the light intensity changeable unit 15.

The optical shutter 100 of FIG. 16A may further include a polarizer and a λ/2 plate on the optical path on the upstream side, and function as an optical isolator. In FIG. 16, the left side is the upstream side and the right side is the downstream side. In that case, when given high voltage is applied between the first electrode 112a and the second electrode 112b of the Pockels cell 110, the optical isolator transmits light at a high rate from both the upstream side and the downstream side. This means that the optical isolator becomes in an open state. On the contrary, when given high voltage is not applied between the first electrode 112a and the second electrode 112b, transmission of light from both the upstream side and the downstream side is suppressed. This means that the optical isolator is in a closed state.

5.2 Second Exemplary Configuration

Next, a specific configuration of a semiconductor optical amplifier 200 applicable as the light intensity changeable unit 15 will be described with reference to FIG. 17.

5.2.1 Configuration

Figure 17:
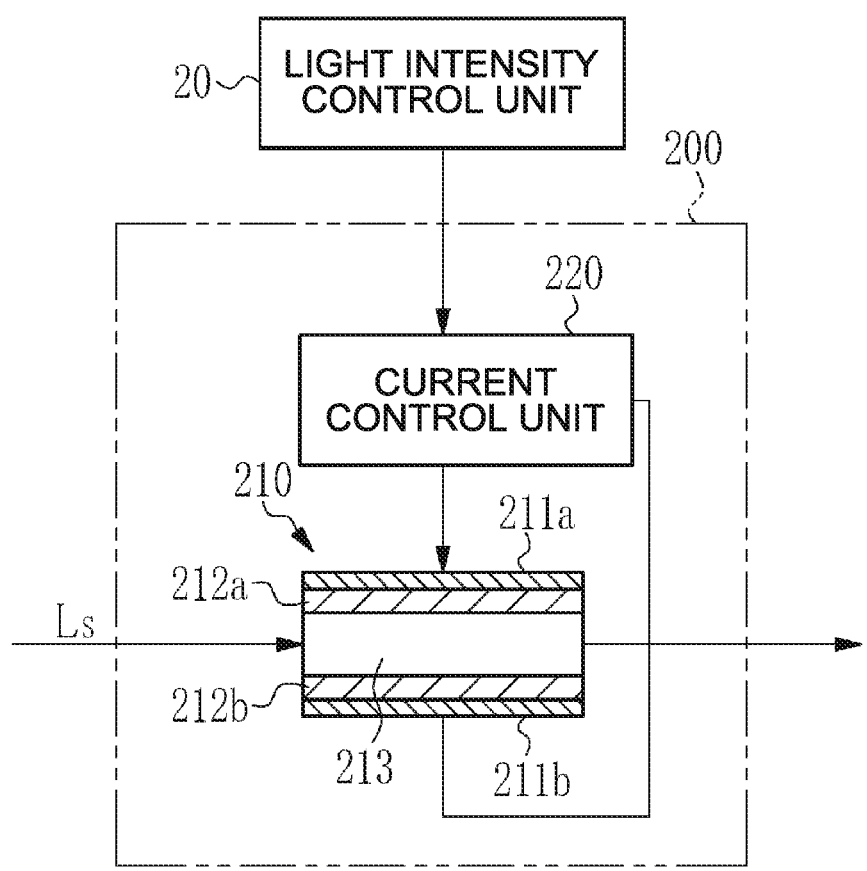
FIG. 17 illustrates an exemplary configuration of a semiconductor optical amplifier 200.

FIG. 17 illustrates an exemplary configuration of the semiconductor optical amplifier 200. The semiconductor optical amplifier 200 includes a semiconductor element 210 and a current control unit 220. The semiconductor element 210 includes a first electrode 211a, a second electrode 211b, a P-type semiconductor layer 212a, an N-type semiconductor layer 212b, and an active layer 213. The first electrode 211a and the second electrode 211b are disposed opposite to each other, and the P-type semiconductor layer 212a, the N-type semiconductor layer 212b, and the active layer 213 are disposed between them. The P-type semiconductor layer 212a and the N-type semiconductor layer 212b are disposed opposite to each other, and the active layer 213 is disposed between them. The first and second electrodes 211a and 211b are connected with the current control unit 220.

In the case of applying the semiconductor optical amplifier 200 as the light intensity changeable unit 15, current control unit 220 is controlled by the light intensity control unit 20. The seed light $L_S$ output from the seed laser 14 is made incident on the active layer 213 of the semiconductor element 210. The output light from the semiconductor optical amplifier 200 is made incident on the amplifier 13 via the dichroic mirror 16.

5.2.2 Operation

The current control unit 220 allows electric current to flow between the first electrode 211a and the second electrode 211b, according to a control signal input from the light intensity control unit 20. When electric current flows between the first electrode 211a and the second electrode 211b, the active layer 213 is excited by the electric current. In a state where the active layer 213 is excited, when the seed light $L_S$ is made incident on the active layer 213, the light intensity of the seed light $L_S$ is amplified.

This means that, when pulse-state electric current flows between the first electrode 211a and the second electrode 211b in a state where the seed light $L_S$ that is CW laser light is applied to the active layer 213, the seed light $L_S$ can be output as the seed pulse light $L_P$. Specifically, the seed pulse light $L_P$ can be generated when the first signal S1 is input from the light intensity control unit 20 to the current control unit 220, and the suppression light $L_D$ can be generated when the second signal S2 is input.

As the semiconductor optical amplifier 200 does not depend on polarization, there is no need to consider the polarization state of the seed light $L_S$ like the case of applying the optical shutter 100 as the light intensity changeable unit 15.

6. Exemplary Application of Solid-State Laser Device to Laser Device Including MO and Amplifier Next, description will be given on an example in which a solid-state laser device is used as an MO of a laser device for an exposure device including an MO and an amplifier, and an excimer laser is used as the amplifier.

6.1 Configuration

Figure 18:
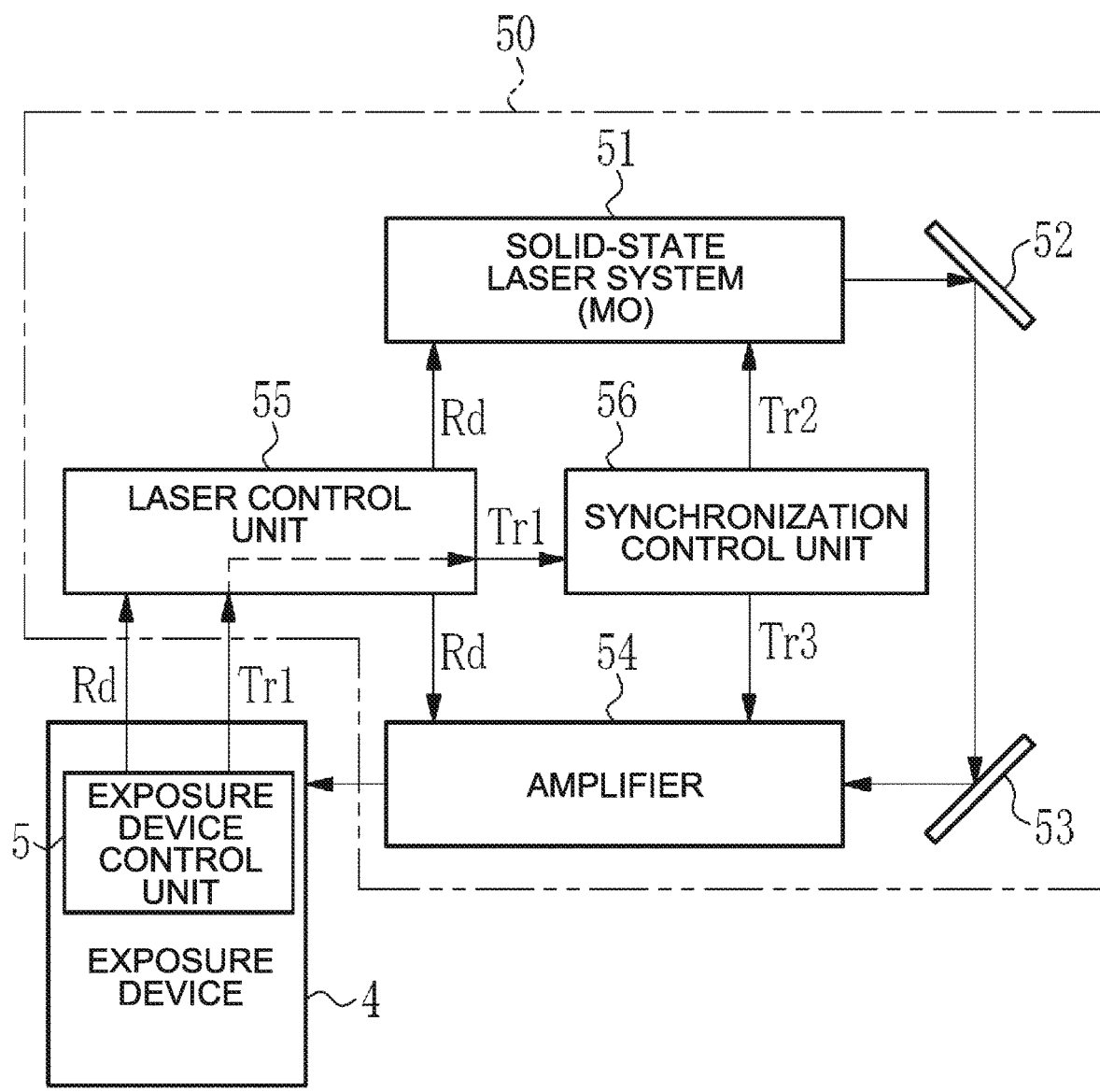
FIG. 18 schematically illustrates a configuration of an MOPA-type (Master Oscillator Power Amplifier type) laser device 50 for an exposure device.

FIG. 18 schematically illustrates a configuration of the laser device 50 for an exposure device including an MO and an amplifier. In FIG. 18, the laser device 50 for an exposure device includes a solid-state laser system 51 as an MO, a first high reflective mirror 52, a second high reflective mirror 53, an amplifier 54, a laser control unit 55, and a synchronization control unit 56.

The laser control unit 55 is connected with the exposure device 4. The laser control unit 55 receives the oscillation preparation signal Rd and a first external trigger signal Tr1 from an exposure device control unit 5 included in the exposure device 4. The laser control unit 55 transmits the oscillation preparation signal Rd received from the exposure device control unit 5, to the solid-state laser system 51 and the amplifier 54. The laser control unit 55 also transmits the first external trigger signal Tr1 received from the exposure device control unit 5, to the synchronization control unit 56.

When the synchronization control unit 56 receives the first external trigger signal Tr1, the synchronization control unit 56 generates a second external trigger signal Tr2 and a third external trigger signal Tr3. The synchronization control unit 56 transmits the second external trigger signal Tr2 to the solid-state laser system 51, and transmits the third external trigger signal Tr3 to the amplifier 54. The synchronization control unit 56 also controls the delay time of the third external trigger signal Tr3 relative to the second external trigger signal Tr2. Specifically, the synchronization control unit 56 controls the delay time such that electric discharge is performed in the amplifier 54 in synchronization with an input of the pulse laser light, output from the solid-state laser system 51, to the amplifier 54.

Figure 19:
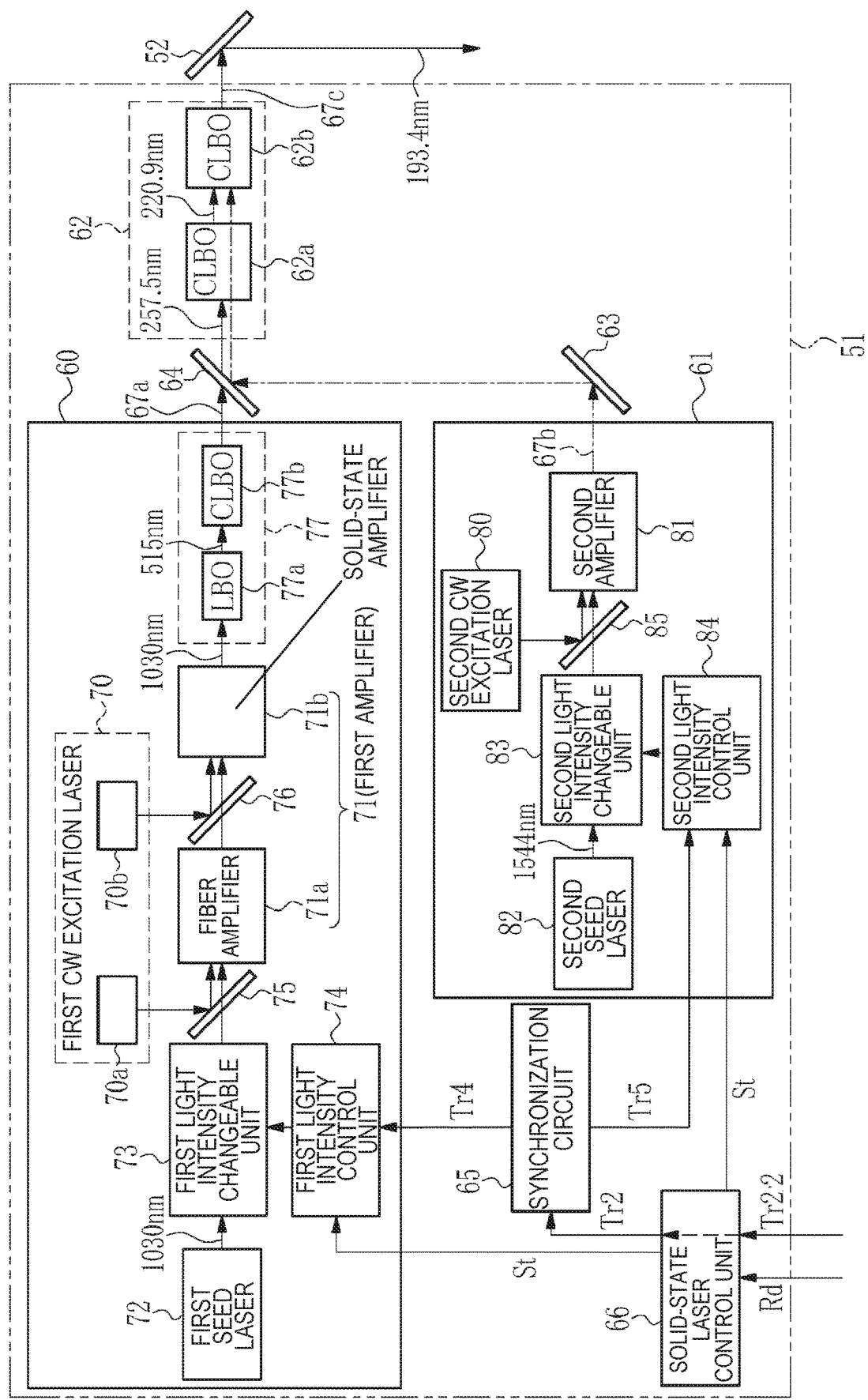
FIG. 19 schematically illustrates a configuration of a solid-state laser system 51 illustrated in FIG. 18.

FIG. 19 schematically illustrates a configuration of the solid-state laser system 51 illustrated in FIG. 18. In FIG. 19, the solid-state laser system 51 includes a first solid-state laser device 60, a second solid-state laser device 61, a sum frequency wavelength conversion unit 62, a high reflective mirror 63, a dichroic mirror 64, a synchronization circuit 65, and a solid-state laser control unit 66. The first solid-state laser device 60 and the second solid-state laser device 61 have a configuration basically similar to that of the solid-state laser device 10a according to the first embodiment or each of the modifications.

The first solid-state laser device 60 includes a first CW excitation laser 70, a first amplifier 71, a first seed laser 72, a first light intensity changeable unit 73, a first light intensity control unit 74, dichroic mirrors 75 and 76, and a wavelength conversion unit 77. The first amplifier 71 includes a fiber amplifier 71a and a solid-state amplifier 71b. The wavelength conversion unit 77 includes an LBO crystal 77a and a CLBO crystal 77b.

The fiber amplifier 71a includes an optical fiber made of Yb-doped synthetic quartz. The fiber amplifier 71a may have multiple stages. The solid-state amplifier 71b is a Yb-doped optical crystal.

The first CW excitation laser 70, the first seed laser 72, the first light intensity changeable unit 73, the first light intensity control unit 74, and the dichroic mirrors 75 and 76 have configurations similar to those of the CW excitation laser 12, the seed laser 14, the light intensity changeable unit 15, the light intensity control unit 20, and the dichroic mirror 16 of the first embodiment or each of the modifications, respectively.

The first CW excitation laser 70 supplies first CW excitation light to the first amplifier 71. The first CW excitation laser 70 includes a CW excitation laser 70a that supplies first CW excitation light to the fiber amplifier 71a, and a CW excitation laser 70b that supplies first CW excitation light to the solid-state amplifier 71b. The CW excitation lasers 70a and 70b are semiconductor lasers that output first CW excitation light having a wavelength of about 976 nm.

The first seed laser 72 is a distributed-feedback semiconductor laser that outputs CW laser light in a single longitudinal mode having a wavelength of about 1,030 nm, as first seed light. It is preferable that the wavelength of the first seed light is in a wavelength range from 1,020 nm to 1,090 nm.

The first CW excitation light output from the CW excitation laser 70a is made incident on the fiber amplifier 71a via the dichroic mirror 75. The first CW excitation light output from the CW excitation laser 70b is made incident on the solid-state amplifier 71b via the dichroic mirror 76.

The first CW excitation laser 70 and the first seed laser 72 are connected with the solid-state laser control unit 66 via signal lines not illustrated.

The second solid-state laser device 61 includes a second CW excitation laser 80, a second amplifier 81, a second seed laser 82, a second light intensity changeable unit 83, a second light intensity control unit 84, and a dichroic mirror 85. The second amplifier 81 is a fiber amplifier including an Er-doped quartz fiber. The second amplifier 81 may be a fiber amplifier including a quartz fiber doped with both Er and Yb. The fiber amplifier may have multiple stages.

The second CW excitation laser 80, the second seed laser 82, the second light intensity changeable unit 83, the second light intensity control unit 84, and the dichroic mirror 85 have configurations similar to those of the CW excitation laser 12, the seed laser 14, the light intensity changeable unit 15, the light intensity control unit 20, and the dichroic mirror 16 of the first embodiment or each of the modifications, respectively.

The second CW excitation laser 80 supplies second CW excitation light to the second amplifier 81. The second CW excitation laser 80 is a semiconductor laser that outputs second CW excitation light having a wavelength of about 976 nm. The second CW excitation light output from the second CW excitation laser 80 is made incident on the second amplifier 81 via the dichroic mirror 85.

The second seed laser 82 is a distributed-feedback semiconductor laser that outputs CW laser light in a single longitudinal mode having a wavelength of about 1,554 nm, as second seed light. It is preferable that the wavelength of the second seed light is in a wavelength range from 1,550 nm to 1,555 nm.

The second CW excitation laser 80 and the second seed laser 82 are connected with the solid-state laser control unit 66 via signal lines not illustrated.

The synchronization circuit 65 receives the second external trigger signal Tr2 from the synchronization control unit 56 via the solid-state laser control unit 66. Upon receipt of the second external trigger signal Tr2, the synchronization circuit 65 generates a fourth external trigger signal Tr4 and a fifth external trigger signal Tr5. The synchronization circuit 65 transmits the fourth external trigger signal Tr4 to the first light intensity control unit 74, and transmits the fifth external trigger signal Tr5 to the second light intensity control unit 84.

The first solid-state laser device 60 outputs first pulse laser light 67a having a wavelength of about 257.5 nm. The second solid-state laser device 61 outputs second pulse laser light 67b having a wavelength of about 1,554 nm. The synchronization circuit 65 controls the timing of the fourth external trigger signal Tr4 and the fifth external trigger signal Tr5 such that the first pulse laser light 67a and the second pulse laser light 67b are made incident on the sum frequency wavelength conversion unit 62 almost simultaneously.

The high reflective mirror 63 is disposed such that the second pulse laser light output from the second solid-state laser device 61 is reflected and is made incident on the dichroic mirror 64. The dichroic mirror 64 is coated with a film that transmits, at a high rate, the first pulse laser light 67a and reflects, at a high rate, the second pulse laser light 67b. The dichroic mirror 64 is disposed such that the optical path axes of the first pulse laser light and the second pulse laser light match and the first pulse laser light 67a and second pulse laser light 67b are made incident on the sum frequency wavelength conversion unit 62.

The sum frequency wavelength conversion unit 62 includes a first CLBO crystal 62a and a second CLBO crystal 62b. The first CLBO crystal 62a and the second CLBO crystal 62b are disposed in this order on the optical path of the first and second pulse laser light 67a and 67b. The sum frequency wavelength conversion unit 62 outputs third pulse laser light 67c that is sum frequency light having a wavelength of about 193.4 nm.

The first and second high reflective mirrors 52 and 53 are disposed such that the third pulse laser light 67c output from the sum frequency wavelength conversion unit 62 is made incident on the amplifier 54.

Figure 20:
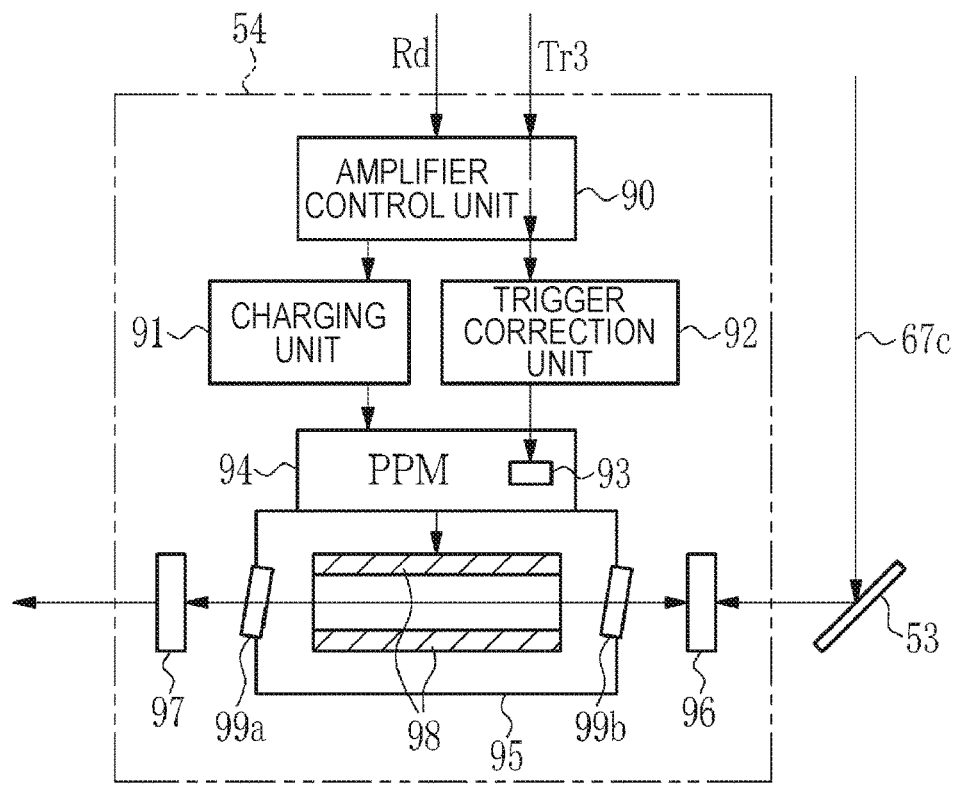
FIG. 20 schematically illustrates a configuration of an amplifier 54 illustrated in FIG. 18.

FIG. 20 schematically illustrates a configuration of the amplifier 54 illustrated in FIG. 18. In FIG. 20, the amplifier 54 includes an amplifier control unit 90, a charging unit 91, a trigger correction unit 92, a pulse power module (PPM) 94 including a switch 93, a chamber 95, a partial reflective mirror 96, and an output coupling mirror 97.

The chamber 95 is provided with windows 99a and 99b. The chamber 95 is filled with laser gas including Ar gas, $F_2$ gas, and Ne gas, for example. In the chamber 95, a pair of discharge electrodes 98 is disposed. The pair of discharge electrodes 98 is connected with an output terminal of the PPM 94.

In the amplifier 54, an optical resonator including a partial reflective mirror 96 and an output coupling mirror 97 is configured. The partial reflective mirror 96 is configured such that a base plate made of a $CaF_2$ crystal that transmits light having a wavelength of about 193.4 nm is coated with a partial reflective film having a reflectance of 70% to 90%. The output coupling mirror 37 is configured such that a base plate made of a $CaF_2$ crystal that transmits light having a wavelength of about 193.4 nm is coated with a partial reflective film having a reflectance of 10% to 20%.

The amplifier control unit 90 transmits the third external trigger signal Tr3 input from the synchronization control unit 56 to the trigger correction unit 92. The trigger correction unit 92 corrects the timing of the third external trigger signal Tr3 and inputs it to the switch 93 of the PPM 94 such that the pair of discharge electrodes 98 discharges electricity in synchronization with an input of the third pulse laser light 67c to the optical resonator.

6.2 Operation

When the laser control unit 55 receives the oscillation preparation signal Rd from the exposure device control unit 5, the laser control unit 55 transmits the oscillation preparation signal Rd to the solid-state laser control unit 66 in the solid-state laser system 51 and to the amplifier control unit 90 in the amplifier 54.

When the solid-state laser control unit 66 receives the oscillation preparation signal Rd, the solid-state laser control unit 66 allows the first and second seed lasers 72 and 82 to start laser oscillation operation and allows the first and second CW excitation lasers 70 and 80 to start laser oscillation operation. When the amplifier control unit 90 receives the oscillation preparation signal Rd, the amplifier control unit 90 allows preparation operation for laser amplification such as rotation of a fan, not illustrated, in the chamber 95.

Next, the solid-state laser control unit 66 outputs the set signal St to the first and second light intensity control units 74 and 84. When the first and second light intensity control units 74 and 84 receive the set signal St, the first and second light intensity control units 74 and 84 input the second signal S2 to the first and second light intensity changeable units 73 and 83, respectively. As a result, first suppression light and second suppression light are output from the first and second light intensity changeable units 73 and 83 to the first and second amplifiers 71 and 81, respectively, whereby an increase of the amplification gain is suppressed.

Next, when the synchronization control unit 56 receives the first external trigger signal Tr1 from the exposure device 4 via the laser control unit 55, the synchronization control unit 56 generates the second external trigger signal Tr2 and the third external trigger signal Tr3. The synchronization control unit 56 controls the delay time of the third external trigger signal Tr3 relative to the second external trigger signal Tr2, and then, outputs the second external trigger signal Tr2 to the solid-state laser control unit 66 and outputs the third external trigger signal Tr3 to the amplifier control unit 90.

Next, the solid-state laser control unit 66 outputs the second external trigger signal Tr2 to the synchronization circuit 65. When the second external trigger signal Tr2 is input, the synchronization circuit 65 generates the fourth external trigger signal Tr4 and the fifth external trigger signal Tr5. The synchronization circuit 65 controls the timing of the fourth external trigger signal Tr4 and the fifth external trigger signal Tr5, and then, outputs the fourth external trigger signal Tr4 to the first light intensity control unit 74, and outputs the fifth external trigger signal Tr5 to the second light intensity control unit 84.

When the fourth external trigger signal Tr4 is input, the first light intensity control unit 74 outputs a ground signal to the first light intensity changeable unit 73. Similarly, when the fifth external trigger signal Tr5 is input, the second light intensity control unit 84 outputs a ground signal to the second light intensity changeable unit 83. When the grounds signals are input to the first and second light intensity changeable units 73 and 84, transmission of the first seed light and the second seed light is suppressed in the first and second light intensity changeable units 73 and 84. Thereby, output of the first suppression light and the second suppression light is stopped, whereby the amplification gain is increased in the first and second amplifiers 71 and 81.

The first light intensity control unit 74 outputs the first signal S1 to the first light intensity changeable unit 73 after the certain time Td elapsed from the input of the fourth external trigger signal Tr4. Similarly, the second light intensity control unit 84 outputs the first signal S1 to the first light intensity changeable unit 73 after the certain time Td elapsed from the input of the fifth external trigger signal Tr5. When the first signal S1 is input to the first light intensity changeable unit 73, the first light intensity changeable unit 73 outputs first seed pulse light in which the first seed light is pulsed, to the first amplifier 71. Similarly, when the first signal S1 is input to the second light intensity changeable unit 83, the second light intensity changeable unit 83 outputs second seed pulse light in which the second seed light is pulsed, to the second amplifier 81.

The first seed pulse light input to the first amplifier 71 is amplified in the first amplifier 71, and is output to the wavelength conversion unit 77 as first amplified light having a wavelength of about 1,030 nm. The first amplified light input to the wavelength conversion unit 77 is converted to fourth harmonic light having a wavelength of about 257.5 nm by the LBO crystal 77a and the CLBO crystal 77b. The fourth harmonic light is output from the first solid-state laser device 60 as the first pulse laser light 67a.

Meanwhile, the second seed pulse light input to the second amplifier 81 is amplified in the second amplifier 81, and is output as second amplified light having a wavelength of about 1,554 nm. The second amplified light is output from the second solid-state laser device 61 as the second pulse laser light 67b.

The first pulse laser light 67a output from the first solid-state laser device 60 and the second pulse laser light 67b output from the second solid-state laser device 61 are made incident on the sum frequency wavelength conversion unit 62 almost simultaneously. The first pulse laser light 67a having the wavelength of about 257.5 nm and the second pulse laser light 67b having the wavelength of about 1,554 nm overlap with each other on the first CLBO crystal 62a included in the sum frequency wavelength conversion unit 62.

In the CLBO crystal 62a, pulse laser light having a wavelength of about 220.9 nm, corresponding to the sum frequency of the wavelength of about 257.5 nm and the wavelength of about 1,554 nm, is generated. Then, in the second CLBO crystal 62b, third pulse laser light 67c having a wavelength of about 193.4 nm, corresponding to the sum frequency of the wavelength of about 220.9 nm and the wavelength of about 1,554 nm, is generated. The third pulse laser light 67c is output from the solid-state laser system 51, and is made incident on the partial reflective mirror 96 of the amplifier 54 via the first and second high reflective mirrors 52 and 53.

The third pulse laser light 67c is input as seed light into the optical resonator of the amplifier 54 including the partial reflective mirror 96 and the output coupling mirror 97. In synchronization with such an input, in the chamber 95 of the amplifier 54, inverted population is formed by discharging between the pair of discharge electrodes 39. At that time, the trigger correction unit 92 corrects the timing of the third external trigger signal Tr3 and inputs it to the switch 93 of the PPM 94 such that the third pulse laser light 67c is amplified efficiently in the amplifier 54. As a result, the optical resonator of the amplifier 54 performs amplification and oscillation, and the amplified pulse laser light is output from the output coupling mirror 97. The amplified pulse laser light has a wavelength of about 193.4 nm, and is input to the exposure device 4.

The first light intensity control unit 74 outputs the second signal S2 to the first light intensity changeable unit 73 during the time after the first signal S1 is output to the first light intensity changeable unit 73 until the fourth external trigger signal Tr4 is input. Similarly, the second light intensity control unit 84 outputs the second signal S2 to the second light intensity changeable unit 83 during the time after the first signal S1 is output to the second light intensity changeable unit 83 until the fifth external trigger signal Tr5 is input.

Thereby, during the time after the third pulse laser light 67c is output from the solid-state laser system 51 until the second external trigger signal Tr2 is input to the solid-state laser system 51, an increase of the amplification gain in the first and second amplifiers 71 and 81 is suppressed. The second signal S2 may have a signal waveform illustrated in any of FIGS. 8D, 11D, 13D, and 14D.

6.3 Effect

As described above, the first and second light intensity control units 74 and 84 in the solid-state laser system 51 respectively output the first signal S1 and the second signal S2 to the first and second light intensity changeable units 73 and 83 in synchronization with inputs of the external trigger signals. Accordingly, the light intensity and the pulse energy of the third pulse laser light 67c output from the solid-state laser system 51 are constant regardless of the pulse interval of the external trigger signals.

Further, in the solid-state laser system 51, an increase of the light intensity and the pulse energy of the third pulse laser light 67c at the head of the burst output, immediately after the start of the burst period after the pause period in the burst operation, is suppressed. As a result, variations in the light intensity and the pulse energy of the pulse laser light amplified by the amplifier 54 are also suppressed.

Even in the solid-state laser system 51, the certain time Td that is a delay time of a signal by the delay circuits included in the first and second light intensity control units 74 and 84 is a fixed value rather than a value that varies according to the pulse interval T of the external trigger signals Tr. The fixed value may be set to each of the delay circuits, included in the first and second light intensity control units 74 and 84, by the solid-state laser control unit 66, according to the pulse energy of the third pulse laser light 67c output from the solid-state laser system 51. For example, the solid-state laser control unit 66 sets the fixed value to be a larger value as the required pulse energy of the third pulse laser light 67c output from the solid-state laser system 51 is higher.

6.4 Definition of Wavelength Conversion Threshold

In the solid-state laser system 51, it is preferable that the wavelength conversion threshold is defined to include the wavelength conversion efficiency of the sum frequency wavelength conversion unit 62, in addition to the wavelength conversion efficiency of the wavelength conversion unit 77. This means that it is preferable to define the wavelength conversion threshold while considering up to the final stage of the wavelength conversion. Specifically, as for the first solid-state laser device 60, a wavelength conversion threshold obtained by combining the wavelength conversion efficiencies of both the wavelength conversion unit 77 and the sum frequency wavelength conversion unit 62 is used as a first wavelength conversion threshold. As for the second solid-state laser device 61, the wavelength conversion threshold of the sum frequency wavelength conversion unit 62 is used as a second wavelength conversion threshold.

The first wavelength conversion threshold is defined as a light intensity of incident light in which a first wavelength conversion efficiency takes a given value. The first wavelength conversion efficiency is a wavelength conversion efficiency in which incident light from the first amplifier 71 to the wavelength conversion unit 77 is converted into sum frequency light by the wavelength conversion unit 77 and the sum frequency wavelength conversion unit 62. The second wavelength conversion threshold is defined as a light intensity of incident light in which a second wavelength conversion efficiency takes a given value. The second wavelength conversion efficiency is a wavelength conversion efficiency in which incident light from the second amplifier 81 to the sum frequency wavelength conversion unit 62 is converted into sum frequency light by the sum frequency wavelength conversion unit 62. It is preferable that the given value is in a range from 1% to 2%, for example. It is also preferable that the given value is in a range from 0% to 0.01%.

Further, the first wavelength conversion threshold may be defined based on a ratio of a second light intensity to a first light intensity. Here, the first light intensity is a light intensity of sum frequency light output from the solid-state laser system 51 according to the first signal S1 generated in the first solid-state laser device 60, and the second light intensity is a light intensity of sum frequency light generated by the solid-state laser system 51 according to the second signal S2 generated in the first solid-state laser device 60. Similarly, the second wavelength conversion threshold may be defined based on a ratio of a fourth light intensity to a third light intensity. Here, the third light intensity is a light intensity of sum frequency light output from the solid-state laser system 51 according to the first signal S1 generated in the second solid-state laser device 61, and the fourth light intensity is a light intensity of sum frequency light generated by the solid-state laser system 51 according to the second signal S2 generated in the second solid-state laser device 61. For example, the first wavelength conversion threshold may be defined as a value in which the ratio of the second light intensity to the first light intensity is in a range from 0% to 10%. Further, the second wavelength conversion threshold may be defined as a value in which the ratio of the fourth light intensity to the third light intensity is in a range from 0% to 10%.

The light intensity of first secondary light generated by an input of first suppression light to the first amplifier 71 is less than the first wavelength conversion threshold. The light intensity of second secondary light generated by an input of second suppression light to the second amplifier 81 is less than the second wavelength conversion threshold.

6.5 Modification Related to Wavelength Conversion Unit

In the solid-state laser system 51 illustrated in FIG. 19, the wavelength conversion unit 77 is provided in the first solid-state laser device 60. However, the wavelength conversion unit 77 may be eliminated. This means that it is possible to have a configuration in which first pulse laser light output from the first solid-state laser device 60 not including a wavelength conversion unit and second pulse laser light output from the second solid-state laser device 61 not including a wavelength conversion unit are made incident on the sum frequency wavelength conversion unit 62.

In that case, the first wavelength conversion threshold of the sum frequency wavelength conversion unit 62 is expressed by a ratio of the second light intensity to the first light intensity. The first light intensity is the light intensity of the sum frequency light generated by an input of the first amplified light to the sum frequency wavelength conversion unit 62, and the second light intensity is the light intensity of the sum frequency light generated by an input of the first secondary light to the sum frequency wavelength conversion unit 62. Similarly, the second wavelength conversion threshold of the sum frequency wavelength conversion unit 62 is expressed by a ratio of the fourth light intensity to the third light intensity. The third light intensity is the light intensity of the sum frequency light generated by an input of the second amplified light to the sum frequency wavelength conversion unit 62, and the fourth light intensity is the light intensity of the sum frequency light generated by an input of the second secondary light to the sum frequency wavelength conversion unit 62. For example, the first wavelength conversion threshold may be defined as a value in which the ratio of the second light intensity to the first light intensity is in a range from 0% to 10%. Further, the second wavelength conversion threshold may be defined as a value in which the ratio of the fourth light intensity to the third light intensity is in a range from 0% to 10%.

6.6 Modifications of Amplifier

The amplifier 54 illustrated in FIG. 20 is applied to the laser device 50 for the exposure device. However, the amplifiers of various configurations may be applicable.

6.6.1 First Modification

Figure 21:
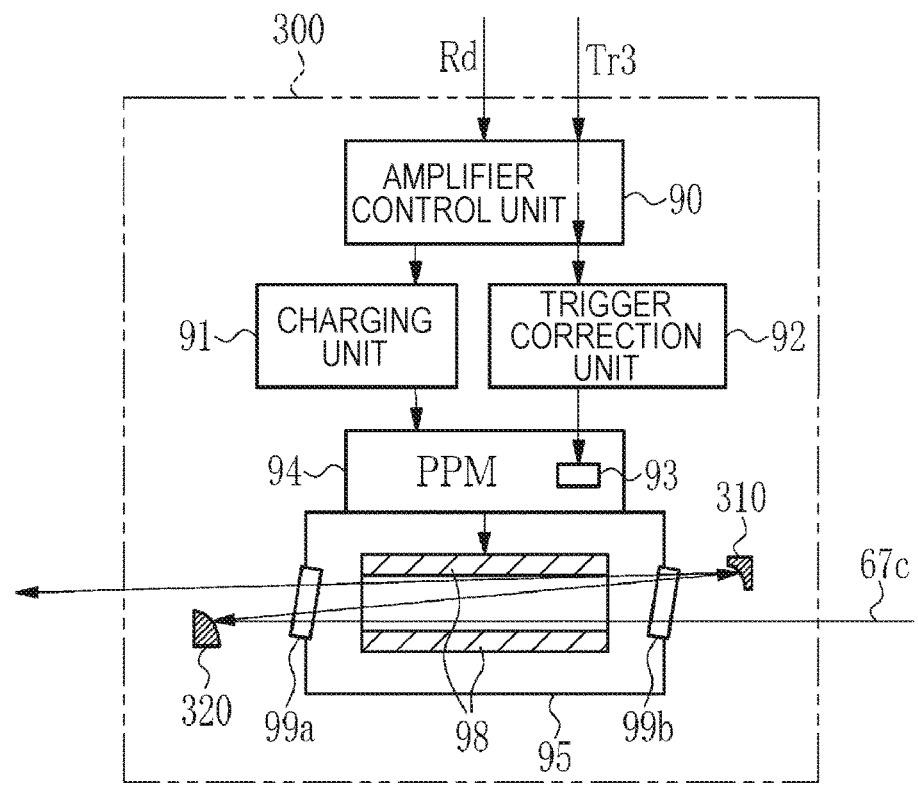
FIG. 21 schematically illustrates a configuration of an amplifier 300 according to a first modification.

FIG. 21 schematically illustrates a configuration of an amplifier 300 according to a first modification. In FIG. 21, the amplifier 300 includes a concave mirror 310 and a convex mirror 320, instead of the partial reflective mirror 96 and the output coupling mirror 97 in the configuration of the amplifier 54 illustrated in FIG. 20. The concave mirror 310 and the convex mirror 320 are disposed such that the third pulse laser light 67c passes through the discharge space between the pair of discharge electrodes 98 three times whereby the beam is expanded. The other configurations of the amplifier 300 are similar to those of the amplifier 54.

In the amplifier 300, the third pulse laser light 67c made incident on the amplifier 300 is reflected by the concave mirror 310 and the convex mirror 320 to thereby pass through the discharge space between the pair of discharge electrodes 98 three times. Thereby, the beam of the third pulse laser light 67c is expanded and amplified, and is output toward the exposure device 4.

6.6.2 Second Modification

Figure 22:
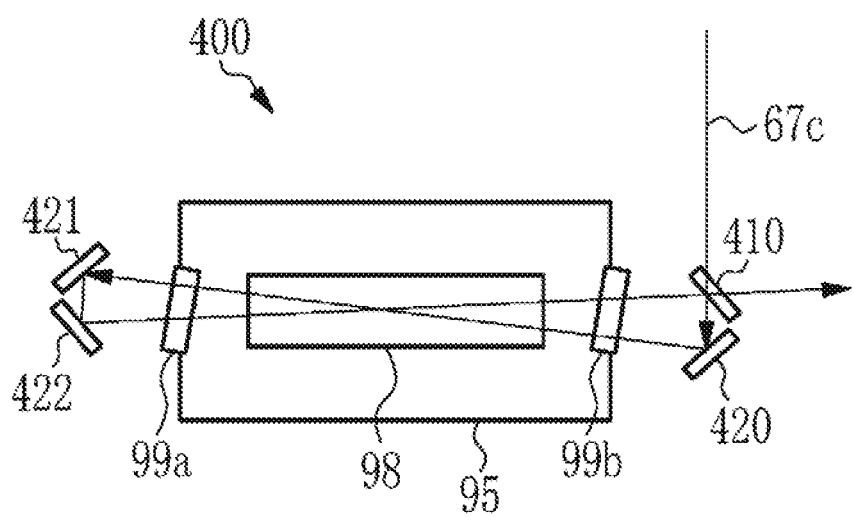
FIG. 22 schematically illustrates a configuration of an amplifier 400 according to a second modification.

FIG. 22 schematically illustrates a configuration of an amplifier 400 according to a second modification. In FIG. 22, the amplifier 400 includes the chamber 95, an output coupling mirror 410, and high reflective mirrors 420 to 422. The amplifier 400 also includes the amplifier control unit 90, the charging unit 91, the trigger correction unit 92, and the pulse power module 94 including the switch 93, although not illustrated, similar to the amplifier 54 illustrated in FIG. 20. The amplifier 400 may also include a high reflective mirror that leads the third pulse laser light 67c from the solid-state laser system 51 to the amplifier 400, and a high reflective mirror that leads the pulse laser light output from the amplifier 400 to the exposure device 4.

The chamber 95 may be provided with the windows 99a and 99b. In the chamber 95, a pair of discharge electrodes 98 is disposed. The pair of discharge electrodes 98 may be disposed opposite to a direction orthogonal to the sheet surface in FIG. 22. The output coupling mirror 410 and the high reflective mirrors 420 to 422 constitute an optical resonator. In the amplifier 400, the third pulse laser light 67c repeatedly travels through the output coupling mirror 410, the high reflective mirror 420, the discharge space between the pair of discharge electrodes 98, the high reflective mirror 421, the high reflective mirror 422, and the discharge space between the pair of discharge electrodes 98, in this order, and is amplified.

7. Other Modifications

In the solid-state laser device described above, a CW excitation laser is used as a semiconductor laser that outputs CW laser light having a wavelength of about 976 nm. However, the semiconductor laser may be changed according to the type of an amplifier that supplies CW excitation light. For example, with respect to an Yb-doped fiber amplifier, it is preferable to use a semiconductor laser that outputs CW laser light having a wavelength of about 976 nm as a CW excitation laser. However, as another example, it is possible to use a semiconductor laser that outputs CW laser light having a wavelength of about 915 nm or about 969 nm. Further, with respect to an Yb-doped fiber amplifier, it is preferable to use a semiconductor laser that outputs CW laser light having a wavelength of about 938 nm as a CW excitation laser.

In the solid-state laser device described above, CW excitation light output from a CW excitation laser is made incident on an amplifier via a dichroic mirror. When the amplifier is a fiber amplifier, it is possible to use a pump combiner instead of the dichroic mirror.

In the solid-state laser device described above, the wavelength conversion unit includes a LBO crystal and a CLBO crystal, and is configured to generate fourth harmonic light. However, various modifications can be made in the configuration of the wavelength conversion unit. It is only necessary that the wavelength conversion unit includes at least one of an LBO crystal, a BBO crystal, a CLBO crystal, and a KBBF ($KBe_2BO_3F_2$) crystal, and is configured to generate secondary or higher harmonic light.

Further, in the laser device for an exposure device described above, the sum frequency wavelength conversion unit includes two CLBO crystals. However, various modifications can be made to the configuration of the sum frequency wavelength conversion unit. It is only necessary that the sum frequency wavelength conversion unit includes at least one CLBO crystal, and is configured to generate third pulse laser light having a sum frequency of first pulse laser light and second pulse laser light.

The description provided above is intended to provide just examples without any limitations. Accordingly, it will be obvious to those skilled in the art that changes can be made to the embodiments of the present disclosure without departing from the scope of the accompanying claims.

The terms used in the present description and in the entire scope of the accompanying claims should be construed as terms "without limitations". For example, a term "including" or "included" should be construed as "not limited to that described to be included". A term "have" should be construed as "not limited to that described to be held". Moreover, an indefinite article "a/an" described in the present description and in the accompanying claims should be construed to mean "at least one" or "one or more".

What is claimed is:

1. A method for generating pulse laser light including:
generating first seed pulse laser light after a first delay time elapsed from an input of a first trigger signal;
amplifying the first seed pulse laser light based on an amplification gain increased with continuous wave excitation light to generate first amplified light;
after generation of the first seed pulse laser light, amplifying second seed pulse laser light based on the amplification gain after a second delay time elapsed from an input of a second trigger signal to generate second amplified light;
generating first suppression light that suppresses an increase of the amplification gain in a period after the first delay time until the input of the second trigger signal;
converting a wavelength of the first amplified light to generate first harmonic light; and
converting a wavelength of the second amplified light to generate second harmonic light.

2. The method according to claim 1, further including generating the first seed pulse laser light and the second seed pulse laser light by changing a light intensity of continuous wave laser light.

3. The method according to claim 1, further including generating second suppression light that suppresses an increase of the amplification gain in a period after the second delay time until an input of a third trigger signal.

4. The method according to claim 1, wherein each of the first delay time and the second delay time takes a fixed value.

5. The method according to claim 4, wherein the fixed value is set according to pulse energy of the second harmonic light.

6. The method according to claim 1, wherein the amplification gain increases during the second delay time.

7. The method according to claim 6, further including generating secondary light of the first suppression light based on the amplification gain.

8. The method according to claim 1, wherein a light intensity of the first amplified light is equal to or greater than a threshold required when the wavelength of the first amplified light is converted to generate the first harmonic light.

9. The method according to claim 7, wherein a light intensity of the secondary light is less than a threshold required when the wavelength of the secondary light is converted to generate the harmonic light of the secondary light.

10. The method according to claim 1, wherein a wavelength conversion efficiency of the first amplified light is in a range from 1% to 2%.

11. The method according to claim 1, wherein a wavelength conversion efficiency of the first amplified light is in a range from 0% to 0.01%.

12. The method according to claim 1, wherein the first suppression light is continuous wave laser light or pulse laser light.

13. The method according to claim 1, further including increasing a light intensity of the first suppression light gradually.

14. The method according to claim 2, further including generating the first seed pulse laser light and the second seed pulse laser light by changing light transmittance of the continuous wave laser light.

15. The method according to claim 2, further including generating the first seed pulse laser light and the second seed pulse laser light by amplifying the continuous wave laser light into pulsed continuous wave laser light.

16. The method according to claim 1, wherein the amplification gain is defined by a Yb-doped solid-state amplifier.

17. The method according to claim 1, wherein each of converting steps includes generating secondary or higher harmonic light by using at least one of an LBO ($LiB_3O_5$) crystal, a BBO ($\beta$-$BaB_2O_4$) crystal, a CLBO ($CsLiB_6O_{10}$) crystal, and a KBBF ($KBe_2BO_3F_2$) crystal.

18. The method according to claim 1, wherein the amplification gain is defined by a Yb-doped fiber amplifier.

19. The method according to claim 18, wherein the amplification gain is further defined by a Yb-doped solid-state amplifier.

* * * * *